US010820148B2

(12) United States Patent
Pao et al.

(10) Patent No.: US 10,820,148 B2
(45) Date of Patent: *Oct. 27, 2020

(54) GEOHASH-RELATED LOCATION PREDICTIONS

(71) Applicant: Lyft, Inc., San Francisco, CA (US)

(72) Inventors: Yuanyuan Pao, San Francisco, CA (US); Snir Kodesh, San Francisco, CA (US); Jatin Chopra, San Francisco, CA (US); Kevin Fan, San Francisco, CA (US); Charlie Lin, San Francisco, CA (US); Limin Shen, San Francisco, CA (US); Dor Levi, San Francisco, CA (US); Asif Haque, San Francisco, CA (US); Zeynep Erkin Baz, San Francisco, CA (US)

(73) Assignee: LYFT, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,797

(22) Filed: Apr. 27, 2020

(65) Prior Publication Data
US 2020/0260219 A1    Aug. 13, 2020

Related U.S. Application Data

(63) Continuation of application No. 16/688,859, filed on Nov. 19, 2019, now Pat. No. 10,638,264, which is a
(Continued)

(51) Int. Cl.
*H04W 24/00* (2009.01)
*H04W 4/02* (2018.01)
(Continued)

(52) U.S. Cl.
CPC ............ *H04W 4/023* (2013.01); *H04W 4/021* (2013.01); *H04W 4/029* (2018.02); *H04W 4/44* (2018.02); *H04W 4/024* (2018.02)

(58) Field of Classification Search
CPC ......... H04W 4/44; H04W 4/021; H04W 4/02; H04W 4/024; H04W 4/023; H04W 4/029;
(Continued)

(56) References Cited

U.S. PATENT DOCUMENTS 6,356,838 B1    3/2002 Paul
8,126,903 B2 *  2/2012 Lehmann ............... G06Q 10/06
                                                     707/758
(Continued)

FOREIGN PATENT DOCUMENTS

CN    105045858 A    11/2015
EP      2507753 A1   10/2013
(Continued)

OTHER PUBLICATIONS

U.S. Appl. No. 13/828,913, dated May 20, 2015, Office Action.
(Continued)

*Primary Examiner* — Mahendra R Patel
(74) *Attorney, Agent, or Firm* — Keller Jolley Preece

(57) ABSTRACT

Embodiments provide techniques, including systems and methods, for determining an estimated target pickup location for a corresponding transport request at a particular location, such as associated with a particular geohash. A requestor may send a request that is associated with a location that does not reflect the requestor's intent regarding where they would like to be met by the provider (i.e., "picked up"). GPS inaccuracies may cause the request location to inaccurately indicate where the requestor will be; for example, the request location may be inside a building while the requestor is waiting on a curb around a far side of the building. The target pickup location allows for a requestor and a provider to meet more efficiently, reducing delay for the provider and improving the efficiency of the system by preventing provider system resources from being
(Continued)

taken from other service areas and decreasing provider downtime upon matching.

20 Claims, 12 Drawing Sheets

Related U.S. Application Data continuation of application No. 16/369,998, filed on Mar. 29, 2019, now Pat. No. 10,547,975, which is a continuation of application No. 16/148,633, filed on Oct. 1, 2018, now Pat. No. 10,285,014, which is a continuation of application No. 15/880,396, filed on Jan. 25, 2018, now Pat. No. 10,091,618, which is a continuation of application No. 15/666,446, filed on Aug. 1, 2017, now Pat. No. 9,894,484, which is a continuation of application No. 15/479,118, filed on Apr. 4, 2017, now Pat. No. 9,769,616.

(51) Int. Cl.
*H04W 4/44* (2018.01)
*H04W 4/021* (2018.01)
*H04W 4/029* (2018.01)
*H04W 4/024* (2018.01)

(58) Field of Classification Search
CPC . H04W 4/04; G06Q 10/08; G06Q 10/063114; G06Q 50/30; G06Q 10/08355; G06Q 10/02; G06F 7/00; G06F 17/30; G06F 15/16; G06F 3/048; G08G 1/202
USPC .............. 455/456.3, 456.1, 457; 705/338.13
See application file for complete search history.

(56) References Cited

U.S. PATENT DOCUMENTS

| | | | | |
|---|---|---|---|---|
| 8,150,967 | B2* | 4/2012 | King | G01S 5/0027 |
| | | | | 709/224 |
| 8,392,116 | B2 | 3/2013 | Lehmann et al. | |
| 8,676,718 | B2* | 3/2014 | Villegas | G06Q 50/12 |
| | | | | 705/332 |
| 9,165,074 | B2* | 10/2015 | Hendrey | G06F 16/9537 |
| 9,230,292 | B2* | 1/2016 | Amin | G06Q 50/30 |
| 9,232,350 | B2* | 1/2016 | Foy | H04W 4/029 |
| 9,547,309 | B2* | 1/2017 | Ross | G05D 1/0088 |
| 9,679,489 | B2* | 6/2017 | Lambert | G06Q 10/06315 |
| 9,769,616 | B1 | 9/2017 | Pao et al. | |
| 9,894,484 | B1 | 2/2018 | Pao et al. | |
| 10,091,618 | B1 | 10/2018 | Pao et al. | |
| 10,285,014 | B2 | 5/2019 | Pao et al. | |
| 10,349,223 | B1 | 7/2019 | Yoo et al. | |
| 10,467,554 | B2 | 11/2019 | Yoo et al. | |
| 10,489,738 | B2 | 11/2019 | Clark et al. | |
| 2004/0260470 | A1 | 12/2004 | Rast | |
| 2005/0015307 | A1* | 1/2005 | Simpson | G06F 16/29 |
| | | | | 705/26.61 |
| 2006/0034201 | A1* | 2/2006 | Umeda | G06Q 30/02 |
| | | | | 370/310 |
| 2006/0241862 | A1 | 10/2006 | Ichihara et al. | |
| 2009/0216600 | A1 | 8/2009 | Hill | |
| 2010/0057502 | A1 | 3/2010 | Arguelles et al. | |
| 2010/0207812 | A1 | 8/2010 | Demirdjian et al. | |
| 2011/0099040 | A1* | 4/2011 | Felt | G08G 1/202 |
| | | | | 705/7.12 |
| 2011/0225269 | A1* | 9/2011 | Yap | G06Q 10/06 |
| | | | | 709/219 |
| 2011/0301985 | A1* | 12/2011 | Camp | G06Q 10/06311 |
| | | | | 705/5 |
| 2011/0313880 | A1* | 12/2011 | Paul | G06Q 30/0631 |
| | | | | 705/26.7 |
| 2012/0232943 | A1* | 9/2012 | Myr | G06Q 10/04 |
| | | | | 705/7.13 |
| 2012/0265433 | A1 | 10/2012 | Viola et al. | |
| 2012/0290652 | A1 | 11/2012 | Boskovic | |
| 2013/0102333 | A1* | 4/2013 | Dam | G06Q 10/0631 |
| | | | | 455/457 |
| 2013/0132140 | A1 | 5/2013 | Amin et al. | |
| 2013/0179205 | A1* | 7/2013 | Slinin | G06Q 10/06 |
| | | | | 705/7.13 |
| 2013/0246207 | A1* | 9/2013 | Novak | G06Q 30/0641 |
| | | | | 705/26.2 |
| 2013/0246301 | A1* | 9/2013 | Radhakrishnan | G06Q 30/0282 |
| | | | | 705/347 |
| 2014/0047381 | A1 | 2/2014 | Fan et al. | |
| 2014/0062886 | A1 | 3/2014 | Pasquero et al. | |
| 2014/0129135 | A1* | 5/2014 | Holden | G08G 1/205 |
| | | | | 701/420 |
| 2014/0129302 | A1* | 5/2014 | Amin | G06Q 30/0641 |
| | | | | 705/13 |
| 2014/0171039 | A1 | 6/2014 | Bjontegard | |
| 2014/0188775 | A1* | 7/2014 | Lehmann | G01C 21/3438 |
| | | | | 706/46 |
| 2014/0188920 | A1 | 7/2014 | Sharma et al. | |
| 2014/0279658 | A1* | 9/2014 | Lievens | G06Q 10/083 |
| | | | | 705/336 |
| 2015/0161554 | A1* | 6/2015 | Sweeney | G06Q 50/30 |
| | | | | 705/7.15 |
| 2015/0161564 | A1* | 6/2015 | Sweeney | G06Q 50/30 |
| | | | | 705/338 |
| 2015/0161697 | A1* | 6/2015 | Jones | G06Q 30/0611 |
| | | | | 705/26.4 |
| 2015/0271290 | A1 | 9/2015 | Tao et al. | |
| 2015/0348221 | A1* | 12/2015 | Pedersen | G06Q 50/10 |
| | | | | 705/7.38 |
| 2016/0027306 | A1 | 1/2016 | Lambert et al. | |
| 2016/0034828 | A1* | 2/2016 | Sarawgi | G06Q 10/00 |
| | | | | 705/5 |
| 2016/0298977 | A1 | 10/2016 | Newlin et al. | |
| 2016/0334797 | A1* | 11/2016 | Ross | G06Q 10/08 |
| 2017/0169535 | A1 | 6/2017 | Tolkin et al. | |
| 2017/0193404 | A1 | 7/2017 | Yoo et al. | |
| 2017/0352125 | A1 | 12/2017 | Dicker et al. | |
| 2018/0259351 | A1* | 9/2018 | Broyles | H04W 4/02 |

FOREIGN PATENT DOCUMENTS

| | | | | |
|---|---|---|---|---|
| EP | 2704121 A1 * | 3/2014 | | G08G 1/01 |
| KR | 20160102894 A | 8/2016 | | |
| WO | WO 2010-056199 A1 | 5/2010 | | |
| WO | WO 2011-069170 A1 | 6/2011 | | |
| WO | WO-2014106617 A1 * | 7/2014 | | G01C 21/26 |
| WO | WO-2017052577 A1 * | 3/2017 | | H04W 4/029 |
| WO | WO 2017-079287 A1 | 5/2017 | | |

OTHER PUBLICATIONS

U.S. Appl. No. 13/828,913, dated Nov. 5, 2015, Office Action.
U.S. Appl. No. 13/828,913, dated Aug. 25, 2016, Office Action.
U.S. Appl. No. 13/828,913, dated Apr. 21, 2017, Office Action.
U.S. Appl. No. 13/828,913, dated Jan. 9, 2018, Office Action.
U.S. Appl. No. 13/828,913, dated Aug. 27, 2018, Office Action.
U.S. Appl. No. 13/828,913, dated Jun. 26, 2019, Notice of Allowance.
U.S. Appl. No. 15/479,118, dated Jun. 28, 2017, Notice of Allowance.
U.S. Appl. No. 15/666,446, dated Oct. 4, 2017, Notice of Allowance.
U.S. Appl. No. 15/880,396, dated May 23, 2018, Notice of Allowance.
U.S. Appl. No. 15/842,202, dated Oct. 30, 2018, Office Action.
U.S. Appl. No. 15/842,202, dated Feb. 27, 2019, Notice of Allowance.
U.S. Appl. No. 16/148,633, dated Dec. 21, 2018, Notice of Allowance.
U.S. Appl. No. 16/369,998, dated Oct. 7, 2019, Notice of Allowance.

(56) References Cited

OTHER PUBLICATIONS

U.S. Appl. No. 16/505,540, dated Jan. 8, 2020, Office Action.
U.S. Appl. No. 16/505,540, dated Apr. 16, 2020, Notice of Allowance.
U.S. Appl. No. 16/688,859, dated Mar. 2, 2020, Notice of Allowance.

* cited by examiner

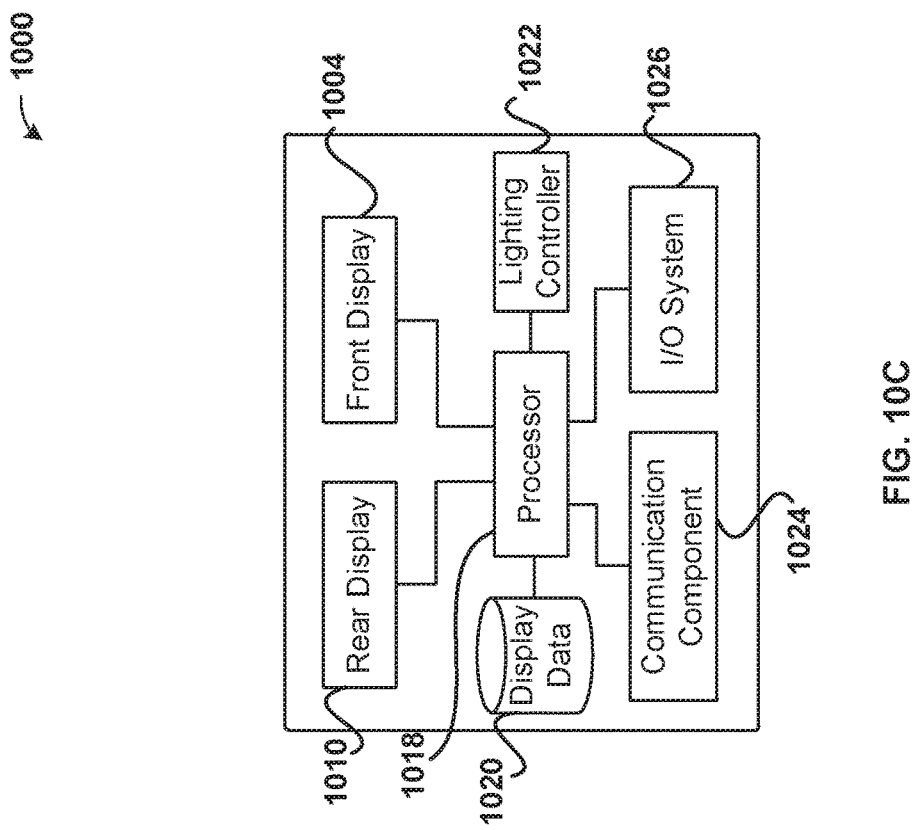
FIG. 10C
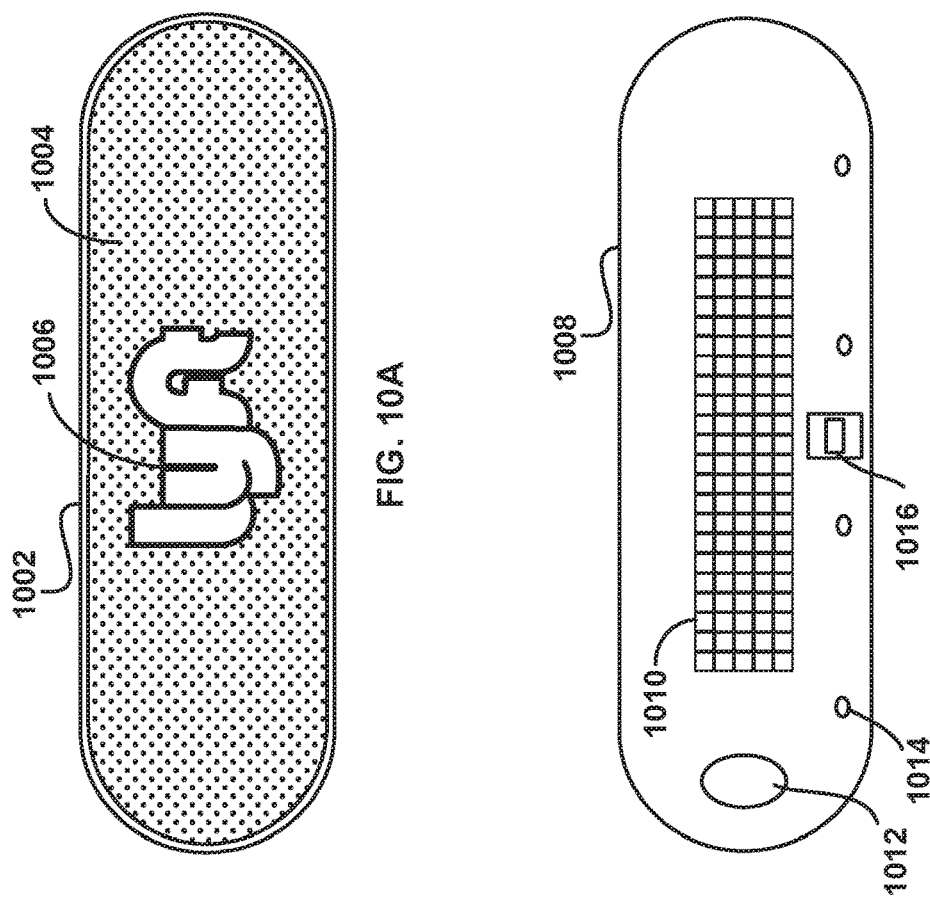
FIG. 10A
FIG. 10B

GEOHASH-RELATED LOCATION PREDICTIONS

CROSS-REFERENCES TO RELATED APPLICATIONS

This present application is a continuation of U.S. application Ser. No. 16/688,859, filed Nov. 19, 2019, which is a continuation of U.S. application Ser. No. 16/369,998, filed Mar. 29, 2019, now issued as U.S. Pat. No. 10,547,975, which is a continuation of U.S. application Ser. No. 16/148,633, filed Oct. 1, 2018, now issued as U.S. Pat. No. 10,285,014, which is a continuation of U.S. application Ser. No. 15/880,396, filed Jan. 25, 2018, now issued as U.S. Pat. No. 10,091,618, which is a continuation of U.S. application Ser. No. 15/666,446, filed Aug. 1, 2017, now issued as U.S. Pat. No. 9,894,484, which is a continuation of U.S. application Ser. No. 15/479,118, filed Apr. 4, 2017, now issued as U.S. Pat. No. 9,769,616. Each of the aforementioned patents and applications are hereby incorporated by reference in their entirety.

BACKGROUND

Traditionally, people have requested and received services at fixed locations from specific service providers. For example, various services were fulfilled by making a delivery to a user at a home or work location. Many services can now be accessed through mobile computing devices and fulfilled at arbitrary locations, often by service providers that are activated on demand. Such on-demand service offerings are convenient for users, who do not have to be at fixed locations to receive the services. However, locations provided by requesting computing devices can be inaccurate and not represent a location where a requestor and a provider should meet to fulfill the on-demand service. Inaccurate and/or inefficient identification of locations related to on-demand service requests can lead to inefficient resource allocation. For example, a requestor and provider may not be able to find each other if the location at which they are to meet is inaccurate, and delay in searching for each other can lead to longer travel times and reduced supply of providers. In some cases, the requestor and provider may not be able to locate each other, which can lead to a service request being cancelled and re-placed in the system with a new provider, despite an available provider being in the area This leads to inefficient resource allocation as cancelled and duplicated requests increase bandwidth and processing needs, as well as disrupting efficient allocation of resources in a geographic area.

BRIEF DESCRIPTION OF THE DRAWINGS

Various embodiments in accordance with the present disclosure will be described with reference to the drawings, in which:

FIGS. 10A-10C illustrates an example provider communication device in accordance with various embodiments.

DETAILED DESCRIPTION

Figure 1:
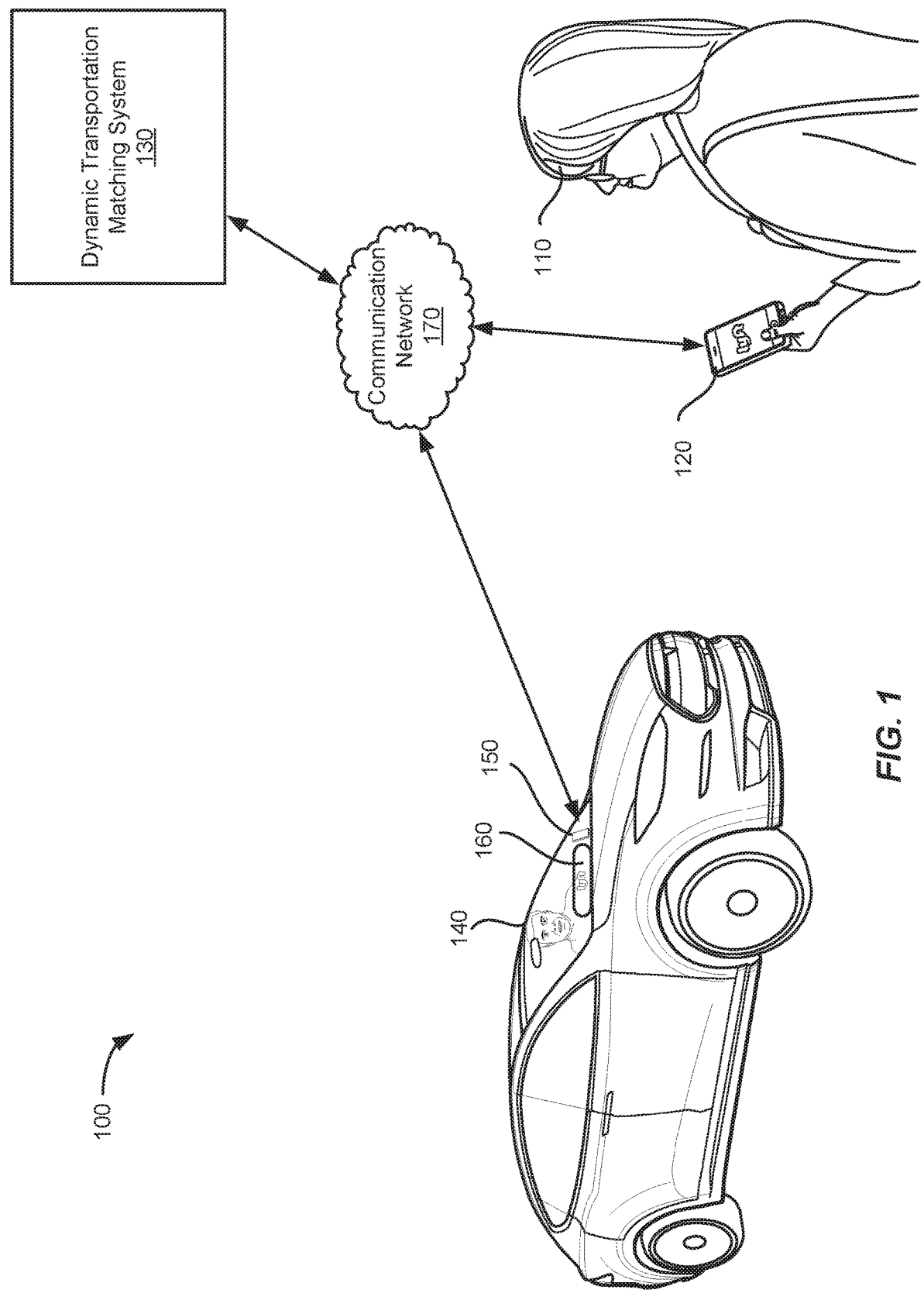
FIG. 1 illustrates an example of a dynamic transportation matching system including a matched provider and requestor, in accordance with an embodiment of the present techniques.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

On-demand services, such as a transportation matching service that matches riders and drivers, such as those accessed through mobile devices, are becoming more prevalent. However, due to the distributed and portable nature of providers and requestors being matched by an on-demand matching system, matching providers and requestors efficiently based on location data provided by electronic devices in sometimes challenging environments can be difficult. For example, a requestor may be in a large building that borders several streets with multiple doors to the outside, and the requestor's electronic device reports her location as being in the middle of the building as part of her request to the service provider, for example due to GPS inaccuracy. As the service provider cannot drive into the middle of the building where the requestor's location is being reported, which may not even be accurate at the time, the provider is forced to guess where an efficient pickup location around the building may be. Because the building is large with many doors, the requestor may have to walk a long route to get to the provider's reported location, which could itself be inaccurate.

In some cases, the requestor's ultimate destination may be best served by meeting a provider on a particular road segment adjacent the building that goes in a certain direction (e.g., towards the destination, on a correct one-way street, etc.). Inefficient pickup location determinations create provider downtime, as he must wait for the requestor to arrive, and in some cases can lead to cancellation of requests and re-booking of additional requests if the parties are not able to find each other within an acceptable amount of time. As the provider is part of an on-demand service, he may not be able to simply provide his service to another requestor in his current location if the current request, for which he traveled from another area, is canceled; instead, he may be routed across town for another on-demand request, whereas if he had been able to pick up the requestor at a convenient location around the building, another provider could have accepted the subsequent request across town, perhaps being able to arrive faster. Provider downtime and inefficient utilization of travel time is problematic because it reduces ride system resources in an area and leads to lower utilization of the provider. Accordingly, the difficulty in matching requests with providers using sub-optimal geographic-based estimates leads to mismanagement of provider resources as well as increased system resources usage (e.g., data processing, bandwidth, and system communications). For instance, providers may cancel a matched request where the requestor is not present at the pickup location, so that they do not have so much downtime waiting on a requestor. Thus, requestors must place more requests in order to obtain a ride as one or more matched requests are canceled before the requestor can locate and/or navigate to the provider. Accordingly, more requests may be generated and processed by a matching service, more accepted, rejected, and declined requests must be processed by the requestor and provider devices, and more system resources must be expended for a matched ride to be successfully completed. Cascading requests and cancellations can lead to provider downtime, as multiple providers accept the soon-to-be-cancelled transport requests in lieu of other requests. The cancelled providers may also grow frustrated with the cancellations and stop providing transport altogether in a particular area, leading to a lack to provider service in that area, potentially at a time of actual high demand.

Accordingly, the specific technical problem of inefficient dynamically-created pickup location predictions in a computer-based dynamic transportation matching system lead to mismanagement of provider resources as well as at least increased data processing, bandwidth utilization, memory usage, and system communications as delay accumulates and cascading requests and cancellations are sent to a dynamic transportation matching system. Therefore, the techniques described herein improve the operation and efficiency of a transportation matching system, as well as the computing systems utilized as part of the transportation matching system infrastructure. By alleviating technical problems specific to dynamic transportation matching systems (e.g., inefficient dynamically-created pickup location predictions, cascading requests and cancellations (e.g., "button mashing"), etc.), the techniques described herein improve the computer-related technology of at least network-based dynamic transportation matching systems by increasing at least computational efficiency and computer resource allocation of at least the computer systems on which the techniques are performed.

At least one embodiment provides techniques, including systems and methods, for determining accurate, efficient, and/or convenient pickup location where a provider may meet a requestor. In one embodiment, a set of instances of prior transport data of various types (e.g., prior request locations, prior actual pickup locations, prior transport start locations, prior transport destinations, and/or prior actual drop-off locations) may be associated with a geographic location. For example, a particular requestor may have multiple locations in a geographic area where she generates requests for service, where she is picked up by a provider, where the service actually begins (e.g., where the provider indicates to the transportation matching system that the service has started), where she provides as her destination, and where she is actually dropped-off by a provider. These instances of transport data may cluster around common locations associated with the requestor. As more instances of prior transport data are generated around various geographical areas (e.g., home, work, frequented businesses, transit stops, etc.), a determination of an efficient pickup location (i.e., a pin location) in the vicinity of the geographical areas may be made, according to various embodiments, although other types of locations corresponding to various types of transport data may also be determined according to various embodiments, such as destination, drop-off points, etc.

In an embodiment, a requestor may not be in a location where she has previously generated prior transport data that could be utilized as part of an approach to determine an appropriate pickup location. For example, a requestor may have traveled to a new city for work, and be in a building at which she has never requested transport (or other on-demand) service. The building may be large and border several streets, and have several entrances and exits; therefore, if the requestor makes a request while inside the building, and her GPS location is provided to the dynamic transportation matching system as (accurately or inaccurately) somewhere inside the building rather than at a curb surrounding the building, then neither the requestor nor the provider will know where to meet. For example, which side of the building, which exit, even in some cases, which elevation; such as an airport, where departures may be on one level and arrivals on another level. According to an embodiment, if the requestor is associated with fewer than a threshold number of instances of prior transport data at a location (i.e., a geographical area), then a determination of geohashes corresponding to the location may be made, at varying levels. For example, a geohash of the requestor's location at geohash-6. The geohash may be refined, such as to geohash-7 in some embodiments. In the selected geohash, prior transport data for other people is analyzed to determine various instances of prior transport data corresponding to their previous requests. For example, 100 people in the building may have made numerous prior service requests where their request location was reported to be inside the building; in some embodiments, it is determined how close their prior request locations are to the current requestor's request location. Their actual pickups related to those requests are analyzed to make a prediction where an efficient pickup location around the (unfamiliar to the requestor) building may be, based on other people's prior transport data. In some embodiment, additional signals may be utilized, such as relationship of the other people to the requestor (e.g., location, company, etc.), destinations of the other people, weather, time of day, etc. These signals, including the amount and/or type of prior transport data, may be assigned varying weights in evaluations to determine one or more predicted pickup locations.

Additionally, one or more embodiments may use road segment data, such as may be stored by a data structure related to road segment system nodes associated with length. Direction, elevation, etc., and further associated with pickup/drop-off locations and distance traveled along respective nodes to get there. For example, road segment data having a particular direction in the geographical area related to the request may be determined, and the directionality evaluated with respect to a navigation route to the requested destination. If a road segment within a threshold distance of a predicted pickup location has road segment data that is more efficient (e.g., is in a direction headed towards the destination, etc.), then the predicted pickup location may be adjusted (or initially placed in some embodiments) to be adjacent (e.g., "snapped") to the appropriate road segment.

Accordingly, embodiments filter potential pickup and/or drop-off locations that will increase the efficiency of the system and optimize the matching system's request matching processing to minimize the number of requests that will require system resources to process. Additionally, filtering transport data related to request locations in order to establish efficient pickup and/or drop-off locations results in more efficient processing of requests by the matching system, leading to fewer system resources necessary to handle a ride request load and an amount of requestor demand in an area. Accordingly, request matching systems are improved through the more efficient matching processing and fewer resources are required to process the same amount of requestor demand.

Although examples described herein generally focus on on-demand ride-sharing applications, any suitable service may be performed using similar functionality. For example, delivery of services may have a similar process implemented to find the location of delivery of the service. Additionally, a "provider" as discussed herein may include, for example, an automated dynamic transportation matching system that dispatches autonomous vehicles to respond to transport requests, an autonomous or otherwise computer-controlled vehicle (in whole or in part), or a human driver.

FIG. 1 illustrates an example of a dynamic transportation matching system 130 including a matched provider 140A and requestor 110A, in accordance with an embodiment of the present techniques. The dynamic transportation matching system 130 may be configured to communicate with both the requestor computing device 120 and the provider computing device 150. The provider computing device 150 may be configured to communicate with a provider communication device 160 that is configured to easily and efficiently display information to a provider 140 and/or a requestor 110. The requestor 110 may use a ride matching requestor application on a requestor computing device 120 to request a ride at a specified pick-up location. The request may be sent over a communication network 170 to the dynamic transportation matching system 130. The ride request may include transport request information that may include, for example, a request location, an identifier associated with the requestor and/or the requestor computing device, user information associated with the request, a location of the requestor computing device, a request time (e.g., a scheduled ride may have a future time for the request to be fulfilled or an "instant/current" time for transportation as soon as possible), and/or any other relevant information to matching transport requests with transport providers as described herein. The request location may include, for example, a current location, a future location, a "best fit/predictive" location, a curb segment, or any other suitable information for indicating a location for a requestor to be found at the current time or in the future. In some embodiments, the transport request may further include other request related information including, for example, requestor transport preferences (e.g., highway vs. sidestreets, temperature, music preference (link to $3^{rd}$ party music provider profile, etc.), personalized pattern/color to display on provider communication device, etc.) and requestor transport restrictions (e.g., pet friendly, child seat, wheelchair accessible, etc.).

The requestor computing device may be used to request services (e.g., a ride or transportation, a delivery, etc.) that may be provided by the provider 140A. The provider computing device may be used to contact available providers and match a request with an available provider. However, a location associated with the request may not be the most efficient location with regard to provider travel time to the request location and/or provider travel time from the request location to a destination location. For example, a provider may have to take a long, circuitous route to the request location, whereas if the requestor were to walk down to a new curb segment on an adjacent block, the provider would have a shorter route to the request location, and/or the provider may have a more efficient route to the destination (e.g., not have to loop around a block, etc.). Thus, embodiments provide a solution that allows a dynamic transportation matching system to determine whether another curb segment within a threshold distance of the request location would reduce travel times associated with one or more legs of a journey (e.g., the journey to the request location, the journey from the request location, a journey with multiple request locations and/or destination locations, etc.) to ensure the most efficient matching leading to the least amount of provider downtime and the most possible throughput by the dynamic transportation matching system.

The dynamic transportation matching system (also referred to as a "ride matching system") 130 may identify available providers that are registered with the dynamic transportation matching system 130 through an application on their provider communication device 150A. The dynamic transportation matching system 130 may send the ride request to a provider communication device 150A and the provider 140A may accept the ride request through the provider communication device 150A. Additionally and/or alternatively, in some embodiments, the provider may be predictively and/or automatically matched with a request such that the provider may not explicitly accept the request. For instance, the provider may enter a mode where the provider agrees to accept all requests that are sent to the provider without the ability to decline and/or review requests before accepting. In either case, the provider computing device may return information indicative of a match indicating that the provider received the transport request. For example, the information indicative of a match may include a provider accept indicator (e.g., a flag) that indicates the provider received and accepts the indicator or could include a variety of different information. For example, the information indicative of a match may include location information, other route information for other passengers in the vehicle, a schedule for the provider providing information regarding future availability (e.g., when they are going to go offline), diagnostics associated with the car (e.g., gas level, battery level, engine status, etc.), and/or any other suitable information. The provider 140A and the requestor 110A may be matched and both parties may receive match information associated with the other respective party including requestor information (e.g., name, representative symbol or graphic, social media profile, etc.), provider information (e.g., name, representative symbol or graphic, etc.), request location, destination location, respective computing device location, rating, past ride history, any of the other transport request information and/or provider acceptance information identified above, and/or any other relevant information for facilitating the match and/or service being provided. Thus, the dynamic transportation matching system 130 may dynamically match requestors and providers that are distributed throughout a geographic area.

Figure 2:
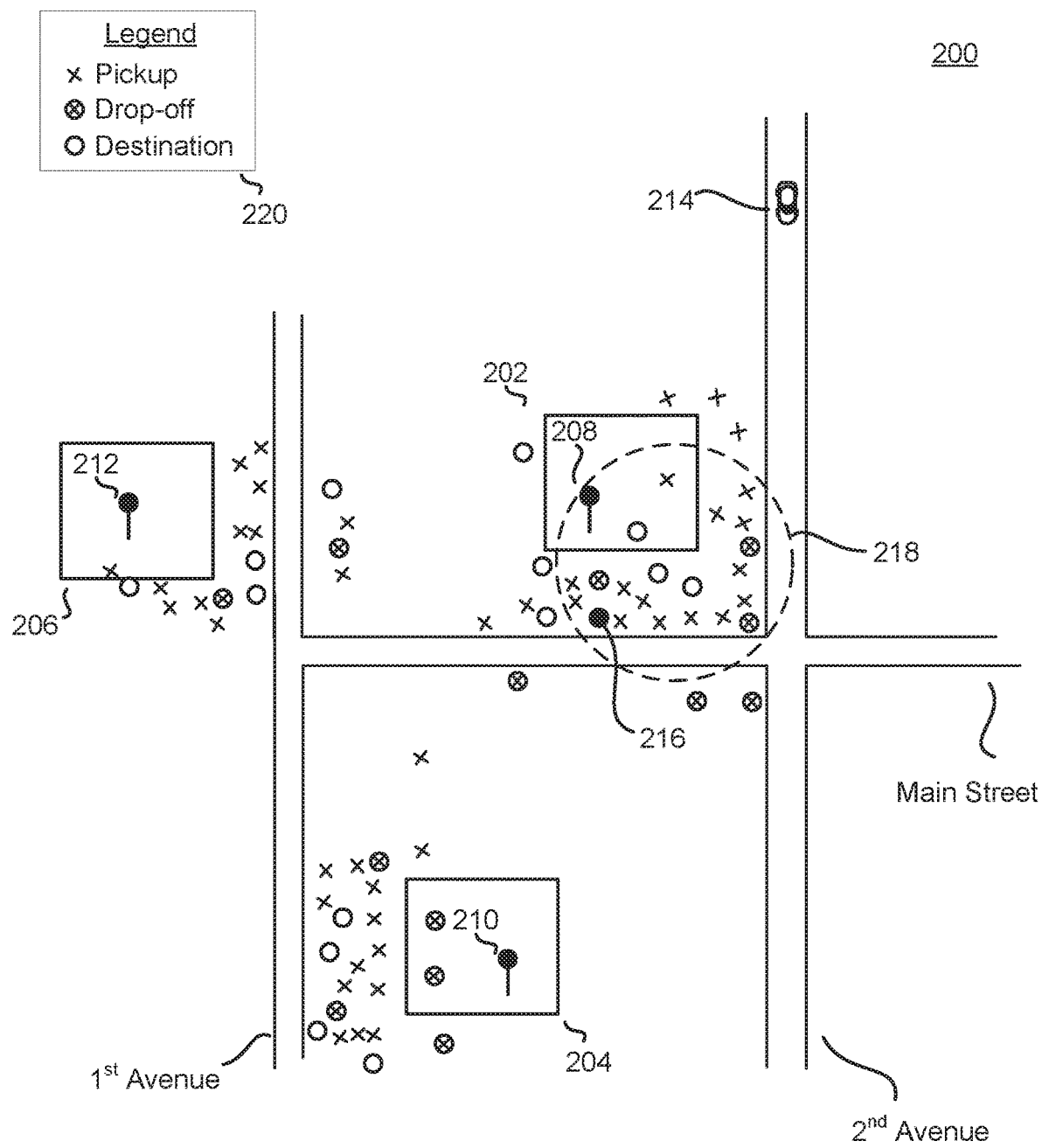
FIG. 2 illustrates an example approach for identifying prior transport data in a geographic location to be utilized by a dynamic transportation matching system, in accordance with an embodiment of the present techniques.

FIG. 2 illustrates an example approach for identifying prior transport data in a geographic location to be utilized by a dynamic transportation matching system, in accordance with an embodiment of the present techniques. In the example 200 of FIG. 2, various buildings 202-206 are situated adjacent roads in a road system. In each building 202-206, a requestor has made a transportation request, which is ultimately matched to a provider 214, having a request location 208-212. This location may be reported by a GPS module on the requestor's electronic device, for example. In some cases, the location may be accurate, in that the requestor was actually in a particular location when the request was sent to the dynamic transportation matching system. In other cases, the locations 208-212 may represent inaccurate GPS locations, such as in a large and/or shielded building where GPS signals are traditionally inaccurate. In other cases, the requestor may have moved the request locations 208-212 from an initial location, perhaps one that was even more inaccurate.

According to an embodiment, prior transport data for the particular requestor in the example 200 of FIG. 2 has been stored and associated with a geographic area. The prior transport data, as identified in the legend 220, comprises numerous types; for example, prior pickup locations (i.e., where the requestor was actually picked up as the result of a request, such as may be reported by location services of the requestor's and/or provider's 214 electronic devices), prior drop-off locations (i.e., where the requestor was actually dropped off at the end of a completed request, such as may be reported by location services of the requestor's and/or provider's 214 electronic devices), and prior request destinations (i.e., where the requestor indicated the request would temporarily stop and/or end). Other types of transport data instances are envisioned, such as prior transport start locations (i.e., where the provider 214 indicated to the dynamic transportation matching system that the request has actually started), as well as prior request locations. In an embodiment, prior transport data may be stored and associated with any number of alternate or additional criteria; for example, prior transport data may be stored and associated with times of transport requests (e.g., requests, pickups, drop-offs, etc.), weather data, event data (e.g., that may be time- or geographically-related and acquired in an embodiment by receiving data from a data store, such as in a response to an application programming interface (API) request), traffic density data (e.g., that may be used as part of a determination regarding contextual activities; for example, a request made at a location at a particular time, along with traffic density being low, may indicate a context that a person is not at work and may be performing a leisure activity such as working out, attending an event, etc., while a request at a busy street corner during rush hour may indicate a context that a person is arriving/leaving work), etc. Social media, event, and/or contact data associated with a person's computing device may also be used, such as to determine contextual activities.

In the example 200 of FIG. 2, the requestor has made a current request 208 having a particular location in a geographical area. In an embodiment, clusters of prior transport data instances around previous requests are identified. For example, various geographical areas associated with the requestor and/or the requestor's computing device are determined, and prior transport data associated with those geographical areas is identified; for example, around the buildings 202-206 in the example 200 of FIG. 2. These clusters of prior transport data may be filtered, such as by being within a threshold amount of time (e.g., within the last month), being within a threshold distance of prior request locations, an average of multiple prior request locations, buildings associated with the requestor and/or prior request locations, road segments, etc.

In an embodiment, after clusters of prior transport data instances are identified, then it is determined whether the current request location 208 is within a geographical area associated with one or more of the clusters. In the example of FIG. 2, the request location 208 has a substantial number of instances of prior transport data identified as having been previously generated in the vicinity. In an embodiment, it is determined whether the geographical area associated with the request location 208 has at least a particular amount of instances of prior transport data. For example, there may be a threshold number of instances to be satisfied within a certain area. A threshold number of one or more types of instances may be required, in some embodiments being based on whether the current action is a transport request or a transport drop-off. For example, in determining an efficient pickup location for the current request 208, unless the geographical area associated with the request 208 has at least a threshold number of prior pickups, as opposed to drop-offs, then the prior transport data may be disregarded. In an embodiment, when determining a target pickup location 216 based on a set of prior transport data, certain instance types may be weighted more heavily, as may instance types being closer and/or farther away from a particular location, such as a building 202, etc.

In an embodiment, a sub-cluster of instances of prior transport data may be identified. For example, not all instances of prior transport data in a particular geographical area (e.g., a building) may be as valuable as others. Some may be far away from the geographical area, such as when the requestor previously walked down the block to meet the provider 214, resulting in a prior pickup location instance that is far away from the prior pickup location's corresponding prior request location, and the geographical area. A sub-clustering approach in an embodiment uses a boundary 218 around the current request location 208 and/or the geographical area associated with the cluster. This boundary may be a uniform radius of a particular distance around the request location 208, or may be an irregularly-shaped boundary, depending on the embodiment. For example, "noisy" instances of prior transport data may not be valuable and/or relevant to a current request location 208; therefore, a boundary 218 is generated outside of which instances of prior transport data are disregarded, weighted less heavily, etc. A determination of a boundary 218 may be based on various factors, such as number of instances of prior transport data contained within, as discussed with regard to FIG. 3. In an embodiment, a boundary 218 is generated such that it includes certain road segments. For example, a request location 208 may be adjacent to roads. In the example 200 of FIG. 2, the request location 208 is adjacent Main Street and $2^{nd}$ Avenue. The boundary 218 for a sub-clustering approach may be generated that includes road segments from both Main Street and $2^{nd}$ Avenue, such as the intersection, as well as road segments of both streets that travel in opposite directions (i.e., the side of the street adjacent the request location 208 and the other side of the street, for a two-way street).

In an embodiment, a target pickup location 216 (or in various embodiments, a target drop-off location, etc.) may be determined based on the request location 208, the geographical area associated with the request location 208, and/or a set of instances of prior transport data, among other data. For example, a location of one or more of a set of instances of prior transport data, such as may be within a boundary 218 of the request location 208, may be identified and evaluated to determine a target pickup location 216, which provides a more accurate and efficient location where the requestor and provider 214 should meet. Embodiments of the disclosed techniques therefore offer an intelligent prediction of a requestor's intent. While a requestor may create a transport request that is associated with a location within a building, the intent of the requestor is not for the provider to drive their car into the building; rather, it is to be met on the curb outside the building, perhaps in front of a specific door. By evaluating prior transport data, such as a relationship between where the requestor previously identified as their request location versus where they were actually picked up for that particular request (or an unrelated request), then a dynamic transportation matching system may suggest pickup locations for future requests that are provided to both requestor and provider, rather than send the reported request location to the provider and leave requestor and provider to find each other once they both are in the same general vicinity.

In an embodiment, a set of instances of various types of prior transport data around a request location 208 is determined, such as within a boundary 218. These instances may then be evaluated with regard to each other in order to suggest a target pickup location for the current request location 208. For example, only prior pickup instances may be considered, and an average location of the prior pickup instances selected as the target pickup location 216. In another example, locations of prior pickup instances may be given a weighting value of 1.25, while prior drop-off instances receive a weighting value of 1.05, and prior destination instances receive a weighting value of 0.85. By combining the weighting values of each of the instances with their locations, a target pickup location 216 may be established that is based on the request location 208 as well as a set of prior transport data. In another example, of a set of prior transport data, a prior request location closest to the current request location 208 is determined, and the location of the actual prior pickup location associated with that particular request is determined and set as the target pickup location 216. In an embodiment, the next-closest prior request location in the set of instances of prior transport data is determined, and the location of the actual prior pickup location associated with that particular request is determined, which is then averaged or otherwise combined with the actual pickup location corresponding to the closest prior request location. In an embodiment, the closest prior request location may be weighted more heavily in the determination.

In an embodiment, previous target pickup locations, generated using the techniques described herein, that are within the geographical area may be determined (e.g., within the boundary, etc.), and a distance between each of the previous target pickup locations and the actual pickup location for that particular request is determined. For example, a target pickup location next to one door may have been suggested in the past, but the requestor and provider actually met 20 yards down the sidewalk. For each of the prior actual pickup locations, the associated request location for that request is identified. For example, for the transport request where the actual pickup was 20 yards down the sidewalk, the original request location (e.g., somewhere within the building) is determined. That original request location is then compared to the current request location 208, and the closer that original request location is to the current request location 208, the actual pickup location for that original request location is more heavily weighted in the determination of the target pickup location 216 for the current request. In this manner, inaccuracy of similar former requests can be used to predict pickup locations for a current request. For example, if a large number of prior requests are from locations in a far corner of the building, and for each of those prior requests, a target pickup location was generated that resulted in an actual pickup around the corner, then it may be surmised that future requests from that particular far corner of the building should use the actual pickup locations from the past requests, not another (inaccurate) target pickup location as before. This distance, as well as other distances, may be determined using the Haversine formula or other approach.

In an embodiment, other factors may be used in generating, increasing, decreasing, etc. of various weighting values assigned to instances of prior transport data. For example, weather data may be used. When a request is received on a rainy day, it may be relevant that certain actual pickup locations were used on previous rainy days; for example, by a door with a short distance to a convenient parking spot. Time data may also be used. For example, many people may be congregating outside a building at 5 PM. Prior pickups at this time may have been further down the street that may otherwise be efficient, to avoid the crowds of people and vehicles. Various other data may also be used in the determination of target pickup locations (and in some embodiments, drop-off locations), such as destinations, road data (e.g., construction, traffic, etc.), safety data (e.g., pedestrian accident data), budget for a particular transport request, such as over time or on a particular day, ratings associated with particular providers, etc.

In an embodiment, a target pickup location may be determined based on movement of user-selectable locations in the past. For example, a potential target pickup location 216 may have been sent to a requestor in response to a prior request. In an embodiment, a requestor's computing device receives modified transport information from the dynamic transportation matching system after a transport match is made; for example, the requestor's computing device may receive a potential target pickup location and display it in a manner that visually distinguishes it from the corresponding request location (e.g., a pin vs. a flashing blue dot), along with walking directions to the potential target pickup location. In an embodiment, a requestor would provide an indication of acceptance of the potential target pickup location, although a requestor may in various embodiments move the potential target pickup location to a new location. For example, a "pin" may be placed on a map displayed at the requestor's computing device (e.g., as part of map data provided by the dynamic transportation matching system, or by receiving data indicating a location of the potential target pickup location and the device placing it on previously-existing map data). The requestor may then use the user interface of the computing device to modify the location of the pin (e.g., touching and dragging on a touch-sensitive screen). This modified location is then provided to the dynamic transportation matching system. In an embodiment, a set of previous potential target pickup locations that were subsequently moved is determined, and the current potential target pickup location is analyzed to determine whether it is within a threshold distance of one or more of the previously-moved potential target pickup locations. If so, then the current potential target pickup location may be repositioned automatically (or initially sent corresponding to) to a location corresponding to the ultimate position of one or more of the previously-moved potential target pickup locations. In an embodiment, the movement of potential target pickup locations is used in an averaging and/or weighting approach to determining a potential target pickup location, as discussed herein.

In an embodiment, the movement of a requestor may be analyzed to determine whether an initial location of a potential target pickup location should be modified. For example, a target pickup location 216 is determined, but the requestor is determined to be moving in a direction away from the target pickup location 216, such as down Main Street towards 1st Avenue in the example 200 illustrated in FIG. 2. This may indicate that the requestor's intent is to be picked up elsewhere, such as at the intersection of Main Street and 1st Avenue, instead of in front of the building 202 from which the request 208 was made. The movement of the requestor may be observed, such as by background polling of a GPS or similar component of the requestor's computing device. If the requestor is determined to be moving away from the request location (and/or the target pickup location 216), and this movement lasts for over a particular duration (e.g., one minute) and/or exceeds a threshold distance away from the request location and/or the target pickup location 216 (e.g., 20 yards from the request location and/or the target pickup location 216), then the target pickup location 216 may be adjusted based on the movement. For example, the target pickup location 216 may "follow" the movement on a lagging basis to avoid overcorrections because of inaccurate GPS, or because the requestor was simply making a temporary deviation from the target pickup location 216, such as by visiting a food truck down the street to get dinner prior to heading home in the provider's vehicle 214.

Figure 3:
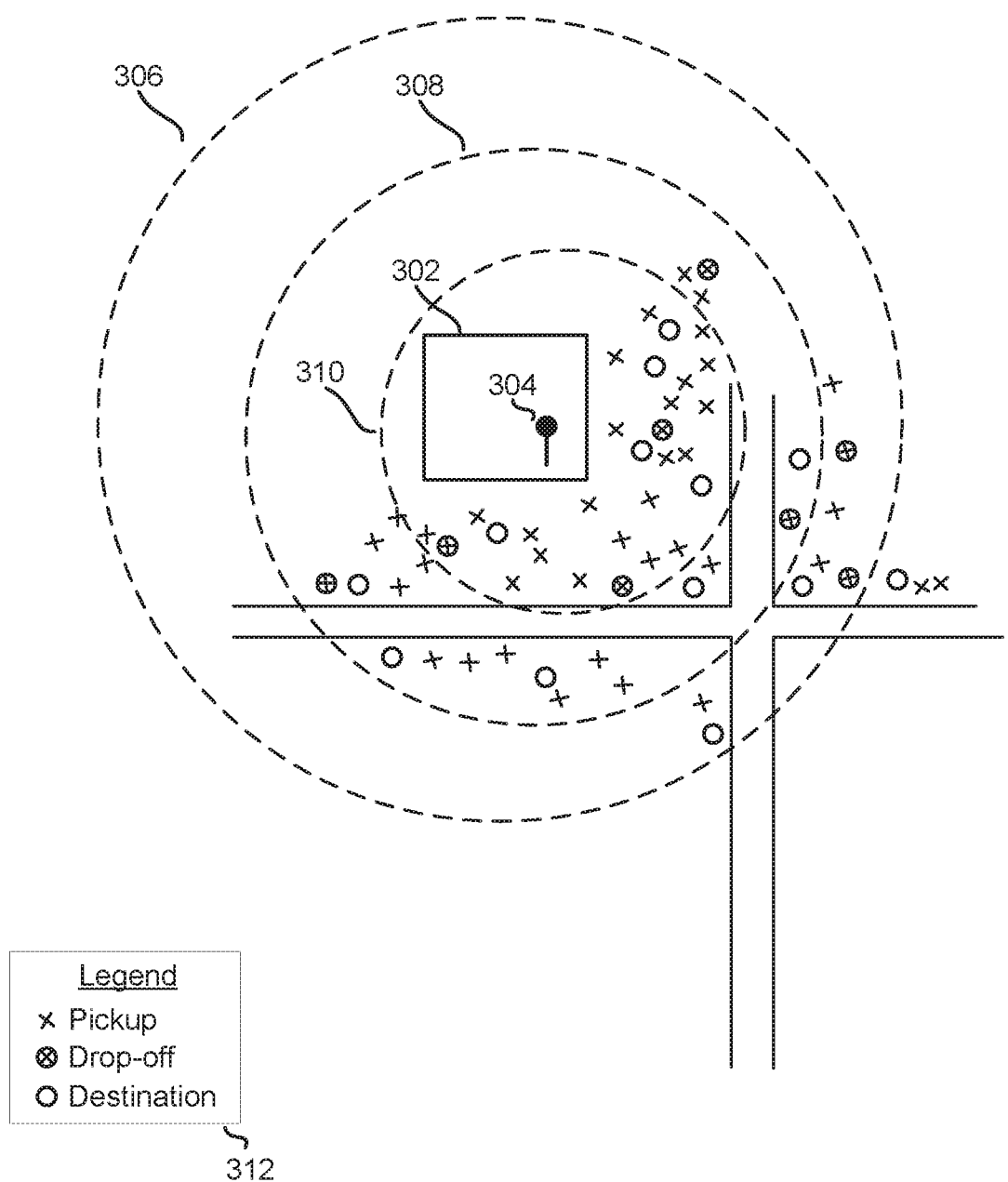
FIG. 3 illustrates an example approach for identifying sets of prior transport data in a geographic location to be utilized by a dynamic transportation matching system, in accordance with an embodiment of the present techniques.

FIG. 3 illustrates an example approach for identifying sets of prior transport data in a geographic location to be utilized by a dynamic transportation matching system, in accordance with an embodiment of the present techniques. In the example 300 of FIG. 3, multiple boundaries 306-310 around a request location 304 in a building 302 are illustrated. In an embodiment, each of the boundaries 306-310 may represent a confidence level associated with various instances of prior transport data (as defined in the legend 220), and may be utilized in order to determine a potential target pickup location within the geographical area, such as may include the building 302 and/or the request location 304. For example, certain instances of prior transport data outside one or more of the boundaries 306-310 may be excluded from the determination of a potential target pickup location, or weighted in a manner so as to de-emphasize their importance in determining a potential target pickup location, for example.

In an embodiment, a particular boundary 306-310 used in the determination of a potential target pickup location, such as by eliminating or de-emphasizing potential instances of prior transport data, may be accomplished by performing a sub-clustering of instances of prior transport data, for example after a preliminary clustering of instances of prior transport data around geographic locations associated with a requestor, such as described with respect to FIG. 2 and elsewhere herein. For example, a number of instances of prior transport data associated with a geographic area (e.g., a geohash, a building, a location, etc.) may be determined, such as by analyzing prior requests and associated location data. These instances of prior transport data may be associated with only one requestor or several, depending on the embodiment. For each of the instances of prior transport data, there is a corresponding location. For example, by working outward from a request location and counting the number of instances of prior transport data, with the closest counted first, the next-closest counted next, and so on, a boundary may be established that contains a set of number of instances of prior transport data and has an outer bound (e.g., the circumference) that is no further away from the request location than the furthest instance of prior transport data in the set. For example, the ten closest instances of prior transport data to a request location are determined, and the boundary is set at a distance away from the request location no greater than the furthest distance associated with the ten closest instances. The eleventh closest instance would then be outside the boundary.

Figure 4A:
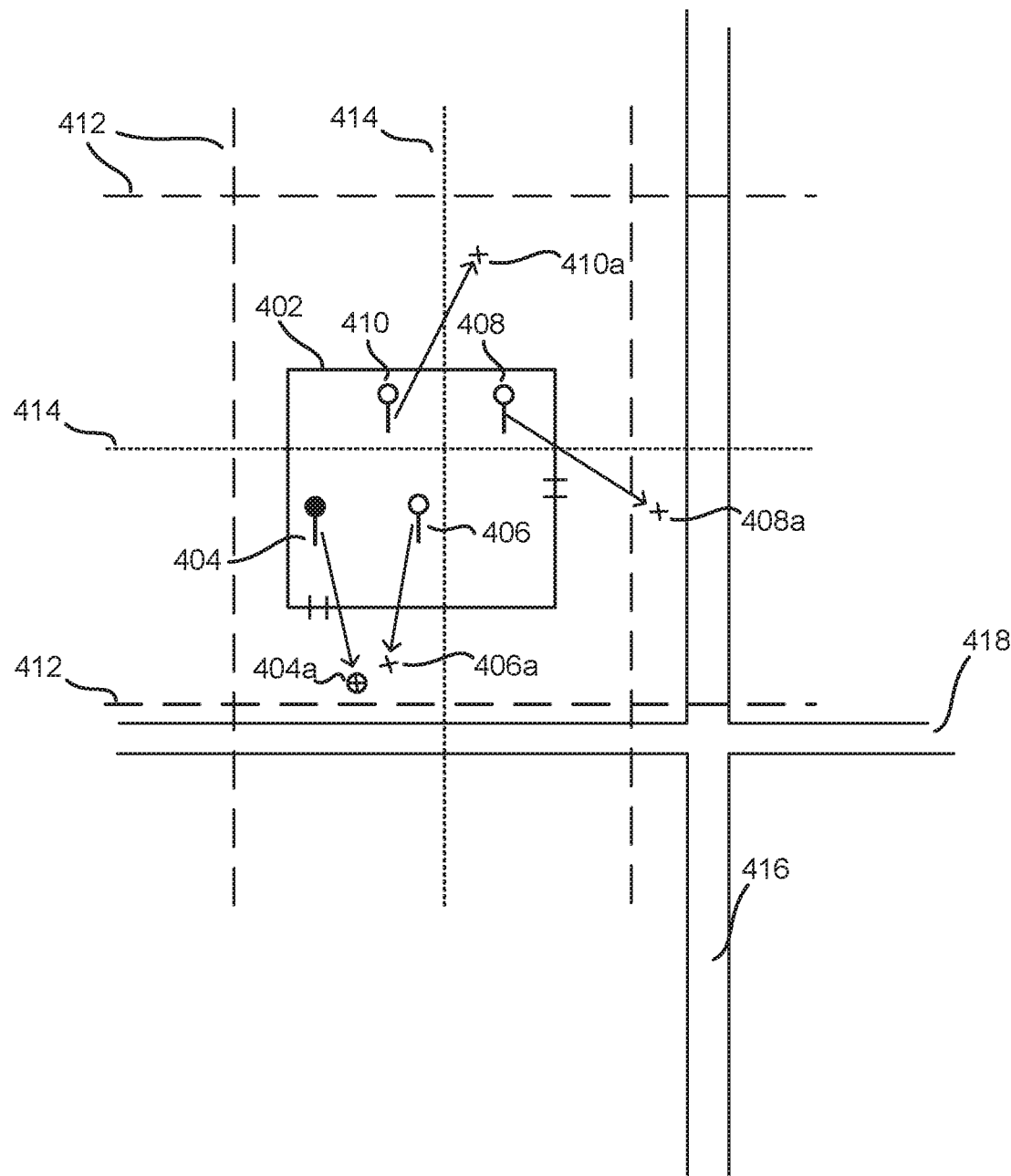
FIGS. 4A-4B illustrate example approaches for identifying prior transport data in a geographic location to be utilized by a dynamic transportation matching system, in accordance with an embodiment of the present techniques.
Figure 4B:
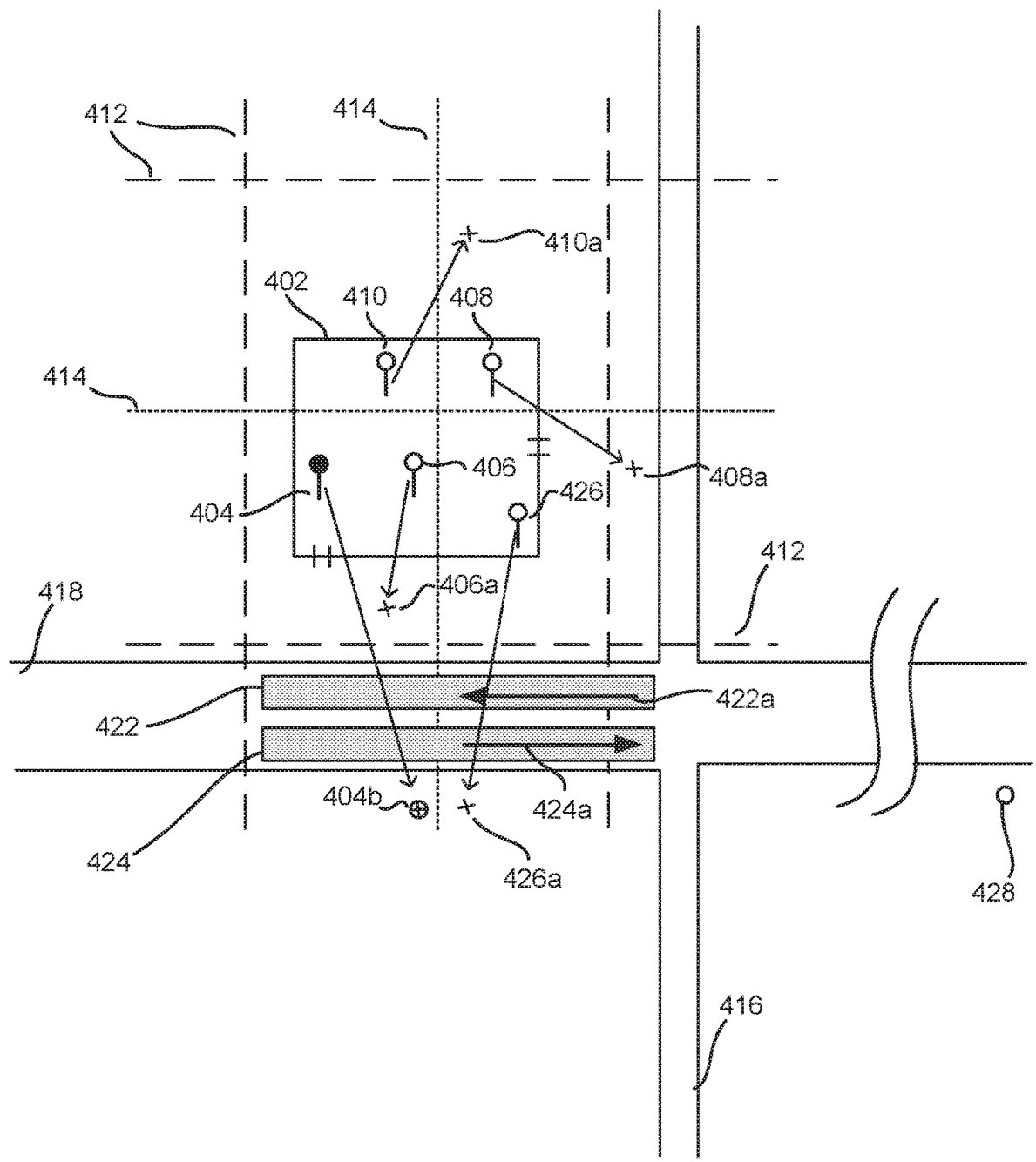

FIGS. 4A-4B illustrate example approaches for identifying prior transport data in a geographic location to be utilized by a dynamic transportation matching system, in accordance with an embodiment of the present techniques. In the example 400 of FIG. 4A, a requestor generates a transport request 404 at a particular location in a building 402 at the intersection of two streets 416-418, and having two exits, one to each street 416-418. In this example, the requestor does not have a cluster of instances of prior transport data associated with the geographic area; for example, she may be visiting this area for the first time, or have fewer than a threshold number of instances of prior transport data associated with the location. Therefore, a potential target pickup location may not be able to be accurately determined based on her prior transport data. However, other people in the geographic area have made requests 406-410 for which there is a corresponding actual pickup location 406a-410a. By using other requestors' instances of prior transport data, a target pickup location 404a for the current requestor may be determined, according to various embodiments.

In an embodiment, geohash data 412, 414 may be used to determine a particular geohash associated with the current request 404. For example, a geohash at a certain level may first be determined 412, then geohashes at a more granular level may be determined 414. A selected geohash is used to identify instances of prior transport data (e.g., that occurred within the particular geohash). In the example of FIG. 4A, there are three prior requests 406-410 and three corresponding actual pickup locations 406a-410a that are associated with other requestors in the past, although in an embodiment, using currently-active requests, or requests that happened within a threshold duration are envisioned. In an embodiment, an averaging approach may be used to determine a target pickup location for the current request 404. For example, an average location of the three actual pickup locations 406a-410a may be selected as a target pickup location. In other embodiments, a weighting approach may be used to determine which, if any, of the set of prior requests 406-410 and/or prior actual pickup locations 406a-410a to use and how important their locations are in the determination of a target pickup location.

For example, geohash data, at varying levels, may be used to determine prior requests that are in proximity to the current request 404. In this example, one prior request 406 is in the same geohash level as the current request 404. In an embodiment, the actual pickup location 406a corresponding to the shared geohash may be used as the target pickup location 404a, or may be given more weight in a determination that uses additional data, such as the other prior requests 408-410, etc. A determination of a degree of importance (e.g., weighting) that may be associated with one or more other instances of prior transport data 406-410, 406a-410a may include a relationship of the requestors associated with the instances of prior transport data; for example, requestors that have devices on or otherwise associated with the same Wi-Fi network may be given greater weight, as it may indicate people who work for the same company. Other requestors who have common authentication or access credentials on their devices may be given greater weight. Common stored addresses (e.g., work, home, restaurants, etc.) on requestors' devices may indicate a relationship that would be useful in determining a potential target pickup location, because people with common features may have a reason to select (or have determined for them) a particular actual pickup location; for example, a pickup location outside a particular door may be most convenient for employees of a particular company that exits out an elevator on one side of the building; thereby eliminating a need to walk all the way across a lobby. Similar destinations may also serve as an indicator or where a target pickup location 404a should be placed. For example, if a subset of prior requests 406-410 shared a certain destination, and a cluster of actual pickup locations for each of the subset may be identified as being outside a particular door, on a particular side of the street, in a particular cul-de-sac nearby, etc., then it may be determined that a current request 404 sharing a destination with one or more of the prior requests 406-410 may be most efficiently served by placing the target pickup location 404a near where the other requests were actually picked up.

In the example 420 of FIG. 4B, a target pickup location 404b may be "snapped" or otherwise moved in proximity to a road segment that is determined based at least on instances of prior transport data to be efficient for the particular destination 428 associated with the request 404. It should be understood that reference numbers are carried over between figures for similar components for purposes of explanation, but that such use should not be interpreted as a limitation on the various embodiments. For example, FIG. 4B illustrates four previous requests 406-410, 426. One request 426 has a corresponding actual pickup location 426a across the street 418. By determining road segment 422, 424 data for the road 418, at least a direction 422a, 424a may be determined. Based on a navigation route to a destination 428 associated with the current request 404, it is determined that the initial travel direction on the route is going in a particular direction 424a shared by one of the road segments 424, for example within a threshold distance of the current request 404. Of the four previous requests 406-410, 426, it is determined that one 426 was associated with the same destination 428, or a destination that required a similar direction of initial travel. As a result, the actual pickup location 426a of the similar request 426 may be used (e.g., solely, weighted more heavily as part of a weighting/averaging approach, etc.) in order to reposition or initially set the target pickup location 404b instead of another potential target pickup location 404a, which may be more appropriate if a destination is not taken into account. According to an embodiment, a data structure (e.g., a portable location format) describing road segments may be generated that describes road segment nodes by such factors as direction, elevation, distance, etc., such as in relation to instances of prior transport data. Such a data structure could be used in order to determine a directionality of various clusters of instances of prior transport data, for example.

Figure 5:
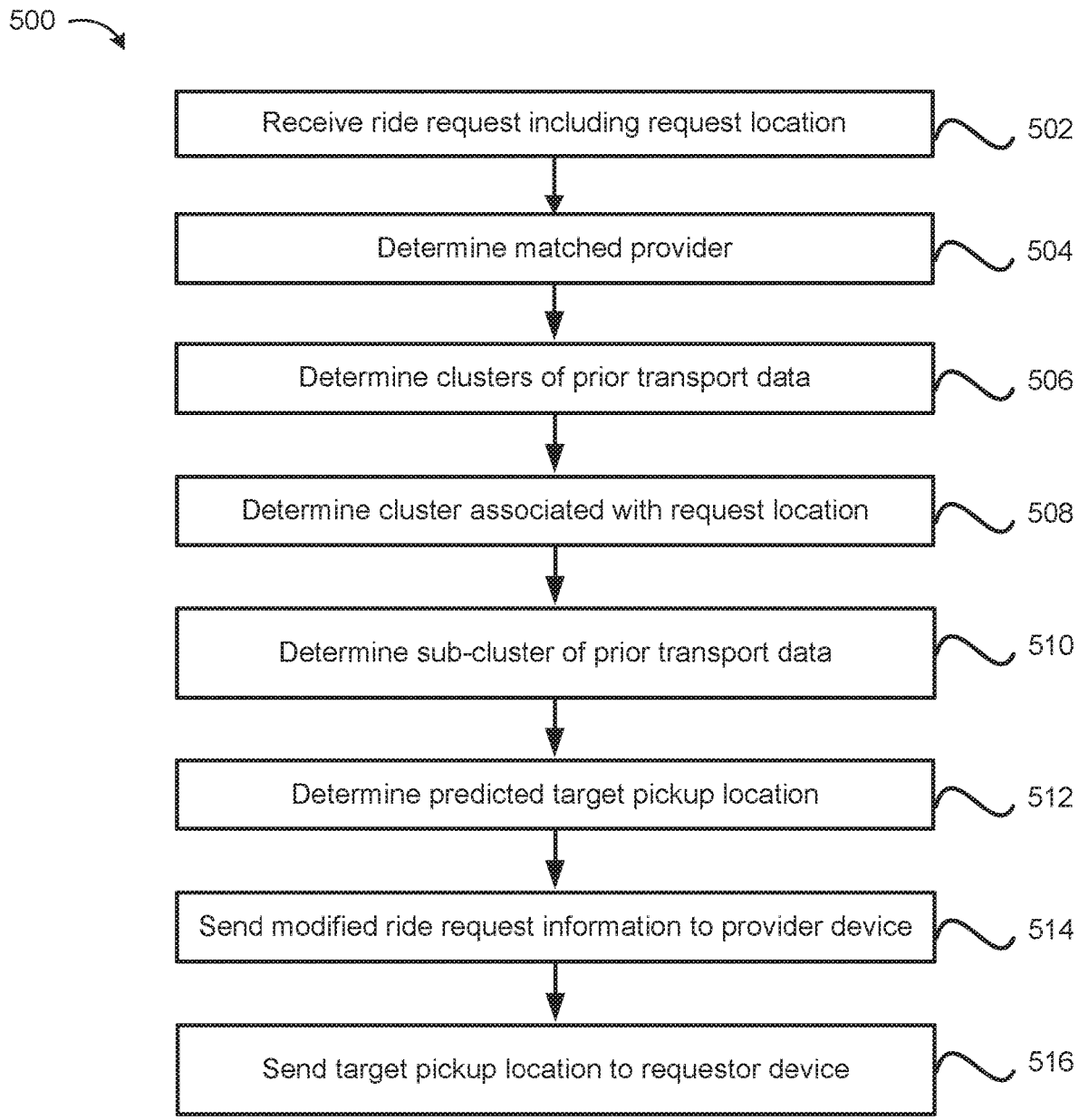
FIG. 5 illustrates an exemplary flow diagram of a method for using prior transport data as part of an approach for predicting locations, in accordance with an embodiment of the present techniques.

FIG. 5 illustrates an exemplary flow diagram 500 of a method for using prior transport data as part of an approach for predicting locations, in accordance with an embodiment of the present techniques. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

At step 502, the dynamic transportation matching system receives a ride request from a requestor computing device. The ride request may include a request location (i.e., pick-up location) for the ride request that corresponds to GPS or other location data of the requestor computing device, a request time, a requestor identifier, a requestor computing device location, and/or any other relevant information associated with the ride request and/or requestor.

At step 504, a matched provider is identified. For example, the closest provider is selected to match with the request. The best provider match may be made using any suitable criteria including rating, existing travel route, and/or any other suitable information.

At step 506, clusters of prior transport data are determined. For example, in particular geographical areas that may correspond to a current location of the requestor and/or the requestor computing device, the current ride request, etc. The clusters may comprise instances of prior transport data types, such as prior request locations, prior actual pickup locations, prior transport start locations, prior transport destinations, and/or prior actual drop-off locations. In various embodiments, the instances of prior transport data may be associated with the current requestor or other requestors, such as those who made requests in the past at the same general location, etc. The clusters may be determined to be associated with various locations that have meaning to the requestor, such as their home, their work, frequently-visited businesses, transit stops, etc. The clusters may be comprised of instances of prior transport data that are determined to be related enough to support their inclusion with other instances of prior transport data to form the cluster; for example, being within a threshold distance of each other; being associated with the same building; having common corresponding instance types that reflect one or more legs of a transport request (e.g., request to pickup to start to destination to drop-off), manual adjustment or indication of relatedness, etc.

At step 508, the geographic areas and/or locations (e.g., buildings, etc.) associated with the clusters of instances of prior transport data are compared to the current request location. For example, if the request location is associated with a certain location (e.g., a building), the nearby clusters are evaluated to determine whether one or more of them are within a threshold distance of the request location, or are otherwise related.

At step 510, in an embodiment, a sub-clustering approach is performed, where the cluster or clusters corresponding to the request location (and in some embodiments, a destination location) is modified to select a subset of the instances of prior transport data comprising the cluster. For example, by only utilizing a set of the X closest instances of prior transport data in a determination of a target pickup location, or establishing a boundary around the request location of lesser area than the geographic area associated with the cluster, and selecting the instances of prior transport data within the boundary (or boundaries).

At step 512, a target pickup location is determined, for example based on the location of the request and the instances of prior transport data in the cluster and/or sub-cluster. Various approaches may be utilized to ascertain a target pickup location from locations of instances of prior transport data. For example, all locations of instances of prior transport data may be mapped and a location in the nominal center of the selected instances used as the target pickup location. In other embodiments, various instances of the prior transport data may be weighted in a determination more heavily than other instances. For example, a target pickup location may be placed in a location that relates more to a certain subset of the instances of prior transport data, such as actual pickup locations of requests that share a similar location with the current request, and so forth. Additional signals may be used to determine which instances of prior transport data should be considered more informative/valuable/accurate in a calculation or estimation of a target pickup location; for example, current and past data corresponding to weather, time, holiday, event, traffic, etc. Addresses that are saved on the requestor's device ("shortcuts") may be used to "pre-fill" a target pickup location (different from the request location) based on the requestor's history and her interaction with the request location in the past.

At step 514, modified ride request information is sent to the provider device. For example, the ride request information sent to the dynamic transportation matching system as part of the request included a request location. As discussed herein, the request location may not accurately reflect the requestor's intent regarding where they would like to actually be picked up. For example, perhaps the GPS signal is inaccurate, or the request location is in a building, etc. Once a target pickup location is determined according to the techniques described herein, the dynamic transportation matching system may modify the ride request information to reflect the target pickup location instead of or in addition to the request location, and send the modified ride request information to the matched provider so they can navigate to the target pickup location.

At step 516, the target pickup location is sent to the requestor computing device, for example as part of the modified ride request information. In an embodiment, the requestor may send an indication to the dynamic transportation matching system that she would like to change the suggested target pickup location, such as by dragging a "pin" to a new location on a map displayed on the screen of the requestor computing device. This will send another set of modified ride request information to the dynamic transportation matching system for additional processing and sending to the provider.

Figure 6:
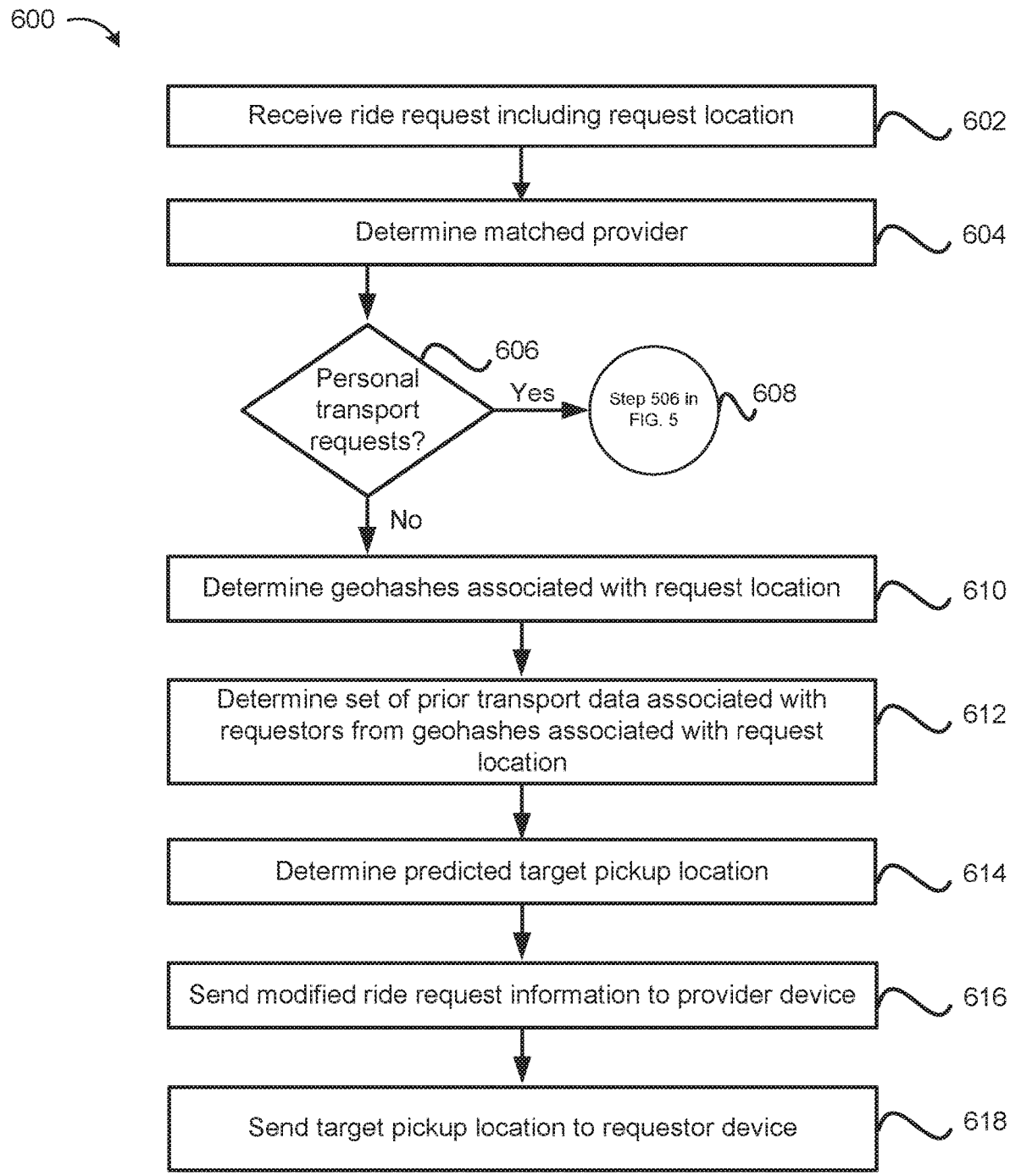
FIG. 6 illustrates an exemplary flow diagram of a method for using geohash-related prior transport data as part of an approach for predicting locations, in accordance with an embodiment of the present techniques.

FIG. 6 illustrates an exemplary flow diagram 600 of a method for using geohash-related prior transport data as part of an approach for predicting locations, in accordance with an embodiment of the present techniques.

At step 602, the dynamic transportation matching system receives a ride request from a requestor computing device. The ride request may include a request location (i.e., pick-up location) for the ride request that corresponds to GPS or other location data of the requestor computing device, a request time, a requestor identifier, a requestor computing device location, and/or any other relevant information associated with the ride request and/or requestor.

At step 604, a matched provider is identified. For example, the closest provider is selected to match with the request. The best provider match may be made using any suitable criteria including rating, existing travel route, and/or any other suitable information.

At step 606, a determination is made whether a threshold number of instances of prior transport data corresponding to the request location exist. For example, if the location has a cluster of instances of prior transport data around it and the number of instances exceeds a threshold number, then control proceeds to step 506 as described with regard to FIG. 5.

If there are insufficient instances of prior transport data associated with the current requestor, then at step 610, geohashes associated with the request location are determined. For example, a geohash-6 and geohash-7 of the request location may be obtained.

At step 612, prior requestors (not the current requestor) who have made requests associated with the selected geohash are determined. In an embodiment, the individual accounts associated with the requests made in the geohash are accessed for analysis, while in an embodiment, only the requests with locations in the geohashes are retrieved.

At step 614, instances of prior transport data, associated with the other requestors, that occurred in the selected geohash are analyzed to determine a predicted target pickup location. For example, the other requests used as part of the determination may only come from requests made in the selected geohash, while in other embodiments, an averaging or weighting approach may be used to determine which locations associated with instances of prior transport data (e.g., actual past pickup locations) will be considered more meaningful in an estimation of a target pickup location. For example, actual past pickup locations of requestors that share a common destination with the current requestor may be weighted more heavily in the determination, along with other signals as discussed herein.

At step 616, modified ride request information is sent to the provider device. For example, the ride request information sent to the dynamic transportation matching system as part of the request included a request location. As discussed herein, the request location may not accurately reflect the requestor's intent regarding where they would like to actually be picked up. For example, perhaps the GPS signal is inaccurate, or the request location is in a building, etc. Once a target pickup location is determined according to the techniques described herein, the dynamic transportation matching system may modify the ride request information to reflect the target pickup location instead of or in addition to the request location, and send the modified ride request information to the matched provider so they can navigate to the target pickup location.

At step 618, the target pickup location is sent to the requestor computing device, for example as part of the modified ride request information. In an embodiment, the requestor may send an indication to the dynamic transportation matching system that she would like to change the suggested target pickup location, such as by dragging a "pin" to a new location on a map displayed on the screen of the requestor computing device. This will send another set of modified ride request information to the dynamic transportation matching system for additional processing and sending to the provider.

Figure 7:
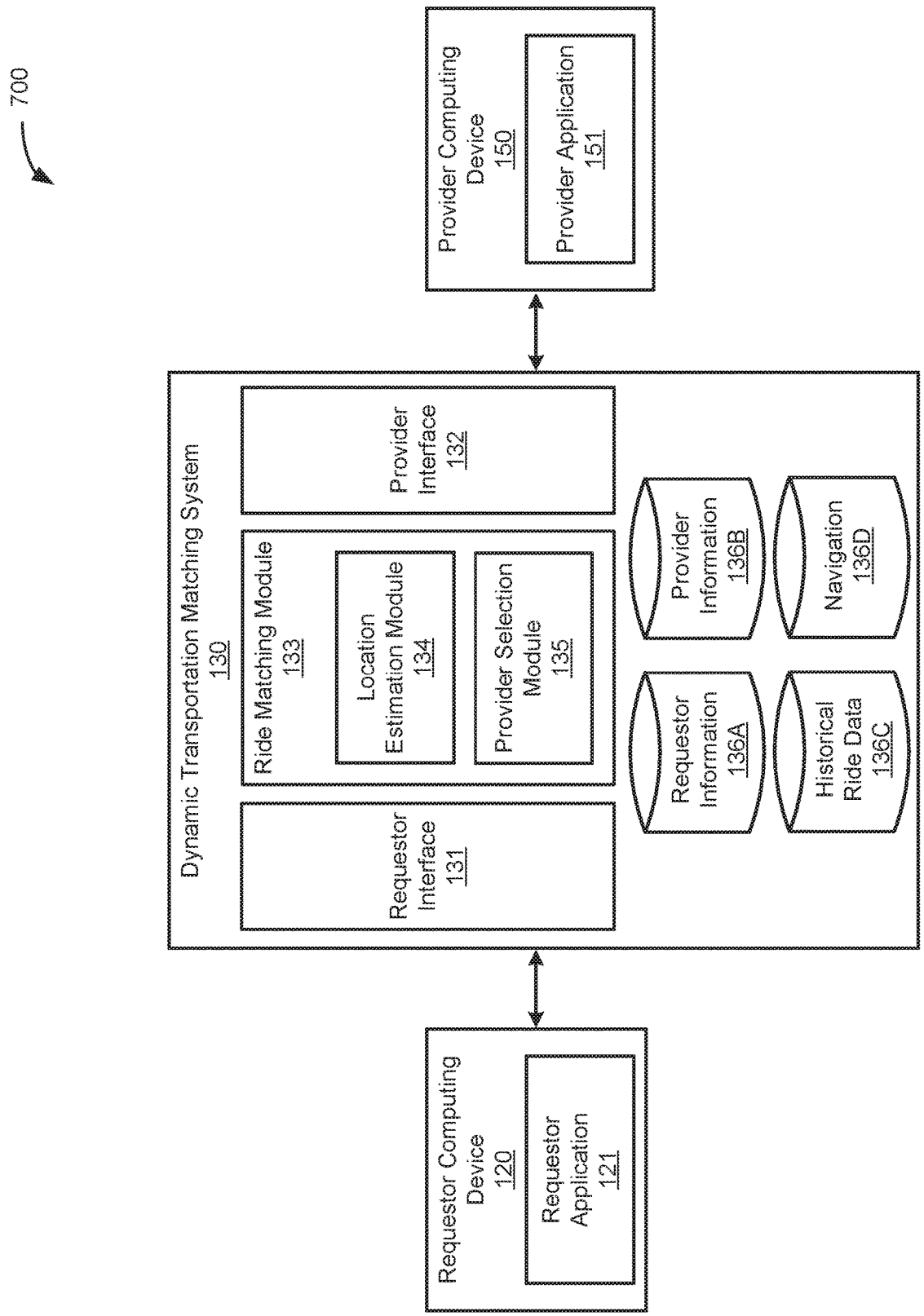
FIG. 7 illustrates an example block diagram of a dynamic transportation matching system, in accordance with embodiments of the present techniques.

FIG. 7 illustrates an example block diagram 700 of a dynamic transportation matching system 130, in accordance with an embodiment of the present techniques. As described above, the dynamic transportation matching system 130 may identify and facilitate request matching from requestors 110 associated with requestor computing devices 120 with available providers 140 associated with provider computing devices 150. The dynamic transportation matching system 130 may include a requestor interface 131, a provider interface 132, and a ride matching module 133 including a location estimation module 134, and a provider selection module 135. The dynamic transportation matching system 130 may also include a requestor information data store 136A, a provider information data store 136B, a historical ride data store 136C, and a navigation data store 136D which may be used by any of the modules of the dynamic transportation matching system 130 to obtain information in order to perform the functionality of the corresponding module. The dynamic transportation matching system 130 may be configured to communicate with a plurality of requestor computing devices 120 and a plurality of provider computing devices 150. Although the dynamic transportation matching system 130 is shown in a single system, the dynamic transportation matching system 130 may be hosted on multiple server computers and/or distributed across multiple systems. Additionally, the modules may be performed by any number of different computers and/or systems. Thus, the modules may be separated into multiple services and/or over multiple different systems to perform the functionality described herein.

Although embodiments may be described in reference to ride requests, any number of different services may be provided through similar request and matching functionality. Accordingly, embodiments are not limited to the matching of ride requests and one of ordinary skill would recognize that embodiments could be implemented for any number of different services that have requestors and providers being matched through a network of connected computing devices.

The requestor interface 131 may include any software and/or hardware components configured to send and receive communications and/or other information between the dynamic transportation matching system 130 and a plurality of requestor computing devices 120. The requestor interface 131 may be configured to facilitate communication between the dynamic transportation matching system 130 and the requestor application 121 operating on each of a plurality of requestor computing devices 120. The requestor interface 131 may be configured to periodically receive ride requests, location information, a request location (also referred to as a "pick-up" location, although in some embodiments, a request location and an actual or target pick-up location are different events), requestor status information, a location of the requestor computing device, progress toward a request location by the requestor computing device, and/or any other relevant information from the requestor computing device 120 when the requestor application 121 is active on the requestor computing device 120. The ride request may include a requestor identifier, location information for the requestor computing device 120, a pick-up location for the ride request, one or more destination locations, a pick-up time, and/or any other suitable information associated with providing a service to a requestor. The ride request may be sent in a single message or may include a series of messages. The ride matching module 133 may receive the ride request and update a historical ride data store 136C with the ride request information, including types of instances of prior transport data (e.g., prior request locations, prior actual pickup locations, prior transport start locations, prior transport destinations, and/or prior actual drop-off locations, etc.).

Additionally, the requestor interface 131 may be configured to send ride match messages, location information for the provider computing device, provider information, travel routes, pick-up estimates, traffic information, requestor updates/notifications, and/or any other relevant information to the requestor application 121 of the requestor computing device 120. The requestor interface 131 may update a requestor information data store 136A with requestor information received and/or sent to the requestor, a status of the requestor, a requestor computing device location, and/or any other relevant information, such as locations of instances of prior transport data as described above.

A requestor computing device 120 may include any device that is configured to communicate with a dynamic transportation matching system 130 and/or provider computing device 150 over one or more communication networks 170. The requestor computing device 120 may comprise a processor, a computer-readable memory, and communication hardware and/or software to allow the requestor computing device 120 to communicate over one or more communication networks 170. For example, a requestor computing device 120 may include a mobile phone, a tablet, a smart watch, a laptop computer, a desktop computer, and/or any other suitable device having a processor, memory, and communication hardware. In some embodiments, the requestor computing device 120 may include a requestor application 121 that is configured to manage communications with the dynamic transportation matching system 130 and interface with the user (i.e., requestor) of the requestor computing device 120. The requestor application 121 may allow a user to request a ride, monitor the status of a matched ride, pay for a ride, monitor past rides, perform any other requestor-oriented services related to the dynamic transportation matching system 130, and/or obtain any other requestor-oriented information from the dynamic transportation matching system 130.

The provider interface 132 may include any software and/or hardware configured to send and receive communications and/or other information between the dynamic transportation matching system 130 and a plurality of provider computing devices 150. The provider interface 132 may be configured to periodically receive location information of the provider computing device 150, provider status information, and/or any other relevant information from the provider computing device 150 when the provider application 151 is active on the provider computing device 150. Additionally, the provider interface 132 may be configured to send ride requests, location information of a requestor computing device 120, pick-up locations, travel routes, pick-up estimates, traffic information, provider updates/notifications, and/or any other relevant information to the provider application 151 of the provider computing device 150. The provider interface 132 may update a provider information data store 136B with provider information received and/or sent to the provider, a status of the provider, a provider computing device location, and/or any other relevant information, including locations of instances of prior transport data as described above.

A provider computing device 150 may include any computing device that is configured to communicate with a dynamic transportation matching system 130 and/or provider computing device 150 over one or more communication networks 170. The provider computing device 150 may comprise a processor, a computer-readable memory, and communication hardware and/or software to allow the provider computing device 150 to communicate over one or more communication networks 170. For example, a provider computing device 150 may include a mobile phone, a tablet, a smart watch, a laptop computer, a desktop computer, and/or any other suitable device having a processor, memory, and communication hardware. In some embodiments, the provider computing device 150 may include a provider application 151 that is configured to manage communications with the dynamic transportation matching system 130 and interface with the user of the provider computing device 150. The provider application 151 may allow a user to accept a ride request, monitor the status of a matched ride, obtain or generate navigation directions or a mapped route for a matched ride, get paid for a ride, monitor past rides, perform any other provider-oriented services related to the dynamic transportation matching system 130, and/or obtain any other provider-oriented information from the dynamic transportation matching system 130.

The ride matching module 133 may include a software module that is configured to process ride requests, ride responses, and other communications between requestors and providers of the dynamic transportation matching system 130 to match a requestor and a provider for a requested service. For example, the ride matching module 133 may be configured to identify available providers for a ride request from a requestor by identifying a geographic region associated with the pick-up location and may search a provider information data store 136B to identify available providers within a predetermined distance of the pick-up location and/or the geographic region.

The ride matching module 133 may include a location estimation module 134 and a provider selection module 135 that are configured to allow the ride matching module to perform efficient matching at target pickup/destination locations using the techniques described herein. For example, when the ride matching module 133 receives the request, the ride matching module 133 may identify available providers in the geographic area around the request location. The ride matching module 133 may use a threshold distance (e.g., 10 miles, 15 miles, etc.), one or more zip codes or other geographic identifiers (e.g., streets, blocks, neighborhoods, city, region, etc.), or any other suitable geographic limitation to identify available providers relevant to a request location. For example, the ride matching module 133 may search the provider information data store 136B to identify any available providers that are located within a certain distance from the request location or have a threshold estimated time of arrival (ETA) to the request location and/or a destination location associated with the request. The ride matching module 133 may also limit the search for available providers to those that meet ride request criteria such that the available provider can serve the request. For example, whether a provider vehicle is a sedan, luxury, SUV, or other type of car, has a particular type of feature or amenity (e.g., car seat, dog friendly, etc.), has a number of available seats (e.g., request for 2 people, etc.), and/or may use any other stored information at the dynamic transportation matching system to limit available providers to those that can serve the request.

Once the ride matching module 133 identifies the available providers in the area, the ride matching module 133 may calculate an estimated travel time for each of the providers from their current location to the request location. As discussed above, the ride matching module 133 may incorporate traffic, weather, road closures, and/or any other conditions that may affect travel time into the estimation. The ride matching module 133 may use historical ride data that is relevant for the time of day, streets and geographic region, as well as stored previous rides over those times, areas, road conditions, and/or any other information to obtain an estimate for the provider to travel from their current location to the request location. For example, the ride matching module 133 may be configured to obtain the location of each of the provider computing devices. The ride matching module 133 may be configured to identify the request location and map navigation routes for each of the providers and the requestor to the request location. The ride matching module 133 may calculate an estimated time of arrival for a variety of different routes based on navigation information obtained from a navigation data store 136D. The navigation information may include real-time and historical traffic information, historical travel time information, known routes for a geographic area or region, traffic rules, and/or any other suitable information for mapping and/or identifying potential routes for traveling from one location to another based on a type of transportation (e.g., driving, biking, sailing, flying, etc.). The ride matching module 133 may map a plurality of possible routes from the provider location to the request location as well as the alternate request locations and generate an estimated arrival time for each of the potential mapped routes. The ride matching module 133 may select the fastest route and/or the most probable route for each of the providers and the corresponding estimated travel time for that route as the estimated travel time for the provider. The ride matching module 133 may incorporate current traffic conditions, road closures, weather conditions, and any other relevant travel time related information to calculate an estimated arrival time for the provider. The estimated arrival time may also be calculated by taking an average of the arrival time of each of the mapped routes, selecting the estimated arrival time for the fastest route, receiving a selection of one of the potential routes by the provider, identifying the route being taken based on the route being used by the provider, and/or through any other suitable method. If the provider makes a wrong turn and/or follows a different route than that calculated by the ride matching module 133, the ride matching module 133 may obtain the updated location of the provider computing device and recalculate the possible routes and estimated arrival times. As such, the estimated travel times may be updated as travel and road conditions, weather, etc. are updated. Accordingly, the ride matching module 133 may determine a navigation route associated with the request location and an estimated travel time for each of the providers. Further, the estimated time may be determined through any suitable method including taking an average of multiple routes, selecting the fastest route, adding additional cushion time when certainty is low for the estimate of the time, etc. Accordingly, the ride matching module 133 may determine an estimated travel time for each of the available providers in the area that may potentially match the request.

The location estimation module 134 may use locations of instances of prior transport data as described above to estimate a target pickup location. For example, the location estimation module may perform clustering of instances of prior transport data and associate the clusters with various locations and/or geographic areas, such as may be obtained from navigation data store 136D or requestor information 136A. The location estimation module 134 may use the instances of prior transport data to estimate a location for a target pickup location that is related to a request location. As discussed herein, a requestor may provide a request location in the middle of a building for various reasons; however, the requestor's intent is to be picked up somewhere outside the building, preferably in a location that leads to an efficient journey and allows the requestor and the provider to meet each other without undue delay. The location estimation module may perform some or all of the techniques described herein to estimate a target pickup location.

The ride matching module 133 may then provide estimated travel times for the providers and the requestor to the provider selection module 135. The provider selection module 135 may obtain the estimated travel times and may select one or more providers that should be matched with the request. Accordingly, the provider selection module 135 may generate a dynamic provider eligibility model that incorporates both the estimated requestor arrival time and the estimated provider times of each of the providers to identify those available providers that are eligible for a match. The provider selection module 135 may then select a subset of the eligible available providers and select one of the providers based on system efficiency, rankings, route, arrival time, and/or any other suitable information that can be used for matching. For example, two available providers may be identified as eligible for a request where one of the providers is traveling away from the request location while the other is traveling toward the request location. The provider selection module 135 may select the provider that is traveling toward the request location because it causes less driving, fewer turns, safer driving, and all the other benefits of allowing providers to maintain their current direction of travel.

Additionally, in some embodiments, the provider selection module 135 may perform available provider prediction to ensure that the best possible match is being made. For instance, the provider selection module 135 may obtain an available provider rate associated with the request location from a historical ride data store 136C that may indicate the historical rate of available providers coming online near the request location. For example, some areas may have a high rate of providers coming online during particular times that the dynamic transportation matching system may use to predict available providers near the request location. For requests that have relatively large requestor arrival times outstanding (e.g., 5+ minutes) and a high rate of predicted available providers, the system may delay matching to an eligible provider even if there are multiple providers that are available and eligible for a request in order to ensure that the a more efficient system match does not arise. Additionally, the ride history data store 136C may be consulted for existing rides that have providers that will be dropping off requestors in the area before the requestor arrival time is up. For instance, if a request is received for a busy area where a number of different providers with requestors are dropping off previously matched requestors and/or where new providers are known to become active during the time frame of the requestor arrival time, the provider selection module 135 may delay matching to see if a provider becomes available in the area that is closer than the existing eligible providers for the request. The ride matching module may repeat the process and monitor the status of the available and matched providers in the area along with the progress of the requestor toward the request location to ensure that a well-matched and eligible provider is matched to the request before the requestor arrives at the request location. Accordingly, by tracking and monitoring system activity as well as using estimated arrival times for the providers and requestor over time, the system can more efficiently and effectively match provider resources with requestor resources to ensure the most efficient matching of resources.

The ride matching module 133 may provide the ride request to the provider interface 132 with the provider contact information or provider identifier so that the ride request may be sent to one or more available providers. The ride matching module 133 may send the ride request and/or the information from the ride request to one or more of the selected available providers to determine whether the available providers are interested in accepting the ride request. The one or more available providers may receive the ride request through the provider application 151 of the provider computing device 150, may evaluate the request, and may accept or deny the request by providing an input through the provider application 151. A ride response message may be sent to the dynamic transportation matching system 130 indicating whether a ride was accepted and including a provider identifier, a location of the provider, and/or any other suitable information to allow the dynamic transportation matching system 130 to process the response. Alternatively, the provider may ignore the request and after a predetermined period of time, the request may be considered denied and a corresponding ride response message may be sent to the dynamic transportation matching system 130. In some embodiments, no response may be sent unless a ride request is accepted and the ride will be assumed to be denied unless a response is received from the provider. In other embodiments, no response is necessary and the ride may be immediately accepted. An indicator, flag, and/or other information may be passed back to the dynamic transportation matching system to assure the system that the provider computing device received the request.

The ride matching module 133 may receive the ride response, evaluate whether the provider accepted or declined the request, and may either find additional available providers for the request (if declined) or determine the ride request has been accepted and send matched ride information to the requestor computing device 120 and the provider computing device 150. The matched ride information may include provider information, requestor information, the pick-up location, the current location of the provider computing device, the current location of the requestor computing device, an estimated time of arrival for the provider, and/or any other suitable information to allow the requestor and the provider to complete the requested service. The ride matching module 133 may update the historical ride data store 136C with the corresponding matched ride information for the matched ride. Accordingly, the ride matching module may perform more efficient and effective matching of requests with providers.

Figure 8:
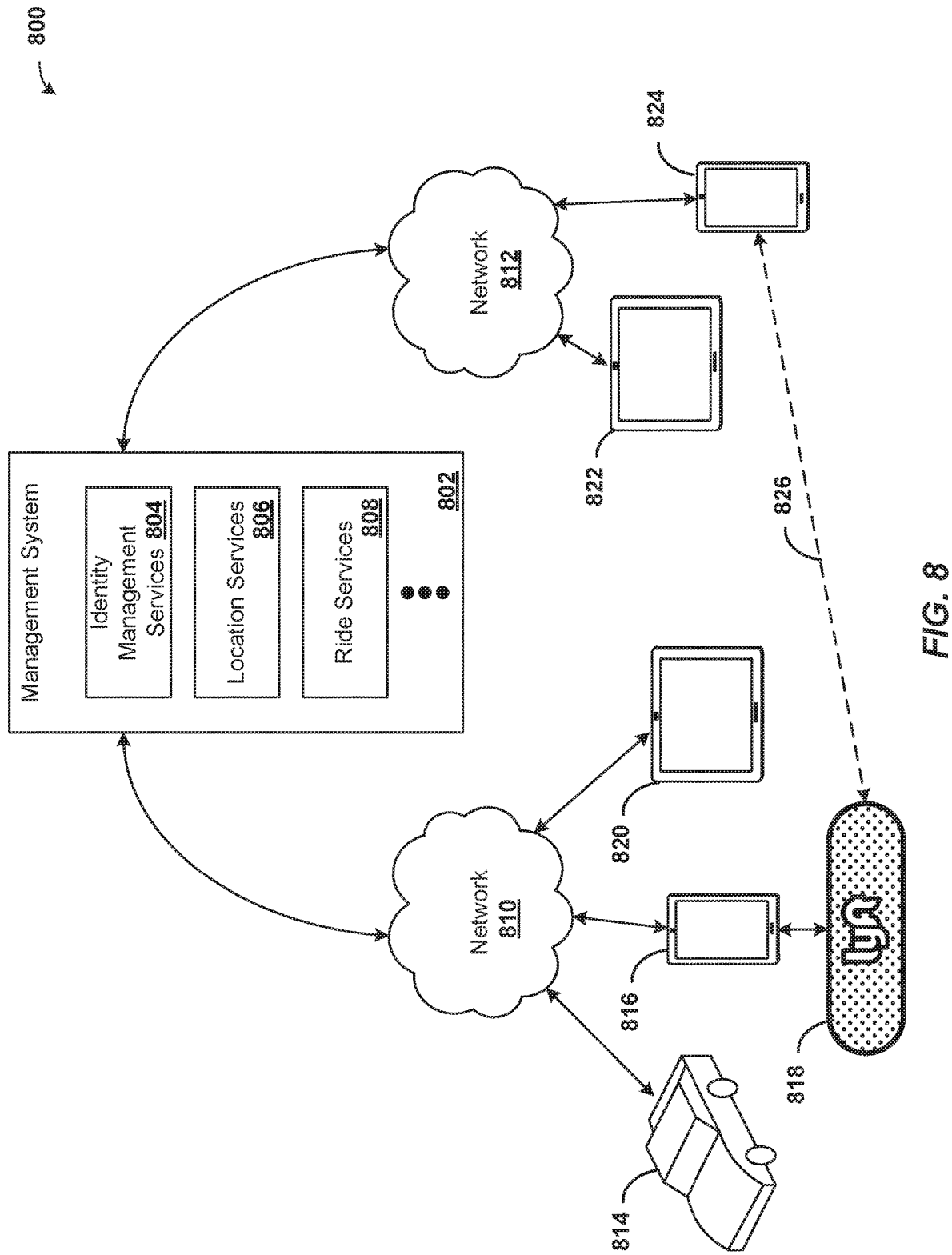
FIG. 8 illustrates an example requestor/provider management environment, in accordance with various embodiments.

FIG. 8 shows a requestor/provider management environment 800, in accordance with various embodiments. As shown in FIG. 8, a management system 802 can be configured to provide various services to requestor and provider devices. Management system 802 can run one or more services or software applications, including identity management services 804, location services 806, ride services 808, or other services. Although three services are shown as being provided by management system 802, more or fewer services may be provided in various implementations. In various embodiments, management system 802 may include one or more general purpose computers, server computers, clustered computing systems, cloud-based computing systems, or any other computing systems or arrangements of computing systems. Management system 802 may be configured to run any or all of the services and/or software applications described with respect to various embodiments of the present techniques described herein. In some embodiments, management system 802 can run any appropriate operating system as well as various server applications, such as common gateway interface (CGI) servers, JAVA® servers, hypertext transport protocol (HTTP) servers, file transfer protocol (FTP) servers, database servers, etc.

Identity management services 804 may include various identity services, such as access management and authorization services for requestors and providers when interacting with management system 802. This may include, e.g., authenticating the identity of providers and determining that the providers are authorized to provide services through management system 802. Similarly, requestors' identities may be authenticated to determine whether the requestor is authorized to receive the requested services through management system 802. Identity management services 804 may also control access to provider and requestor data maintained by management system 802, such as driving and/or ride histories, personal data, or other user data. Location services 806 may include navigation and/or traffic management services and user interfaces, or other location services.

In various embodiments, ride services 808 may include ride matching and management services to connect a requestor to a provider. Ride services 808 may include a user interface and or may receive data from requestors and providers through applications executing on their respective devices. Ride services 808 may, e.g., confirm the identity of requestors and providers using identity management services 804, and determine that each user is authorized for the requested ride service. In some embodiments, ride services 808 can identify an appropriate provider using a location obtained from a requestor and location services 806 to identify, e.g., a closest provider. As such, ride services 808 can manage the distribution and allocation of provider and requestor resources, consistent with embodiments described herein.

Management system 802 can connect to various devices through network 810 and 812. Networks 810, 812 can include any network configured to send and/or receive data communications using various communication protocols, such as AppleTalk, transmission control protocol/Internet protocol (TCP/IP), Internet packet exchange (IPX), systems network architecture (SNA), etc. In some embodiments, networks 810, 812 can include local area networks (LAN), such as Ethernet, Token-Ring or other LANs. Networks 810, 812 can include a wide-area network and/or the Internet. In some embodiments, networks 810, 812 can include VPNs (virtual private networks), PSTNs (a public switched telephone networks), infra-red networks, or any wireless network, including networks implementing the IEEE 802.11 family of standards, Bluetooth®, Bluetooth® Low Energy, NFC and/or any other wireless protocol. In various embodiments, networks 810, 812 can include a mobile network, such as a mobile telephone network, cellular network, satellite network, or other mobile network. Networks 810, 812 may be the same as communication network 170 in FIG. 1. In some embodiments, networks 810, 812 may each include a combination of networks described herein or other networks as are known to one of ordinary skill in the art.

Users may then utilize one or more services provided by management system 802 using applications executing on provider and requestor devices. As shown in FIG. 8, provider computing devices 814, 816, 818, and/or 820 may include mobile devices (e.g., an iPhone®, an iPad®, mobile telephone, tablet computer, a personal digital assistant (PDA)), wearable devices (e.g., head mounted displays, etc.), thin client devices, gaming consoles, or other devices configured to communicate over one or more networks 810, 812. Each provider or requestor device can execute various operating systems (e.g., Android, iOS, etc.) and configured to communicate over the Internet, Blackberry® messenger, short message service (SMS), email, and various other messaging applications and/or communication protocols. The requestor and provider computing devices can include general purpose computers (e.g., personal computers, laptop computers, or other computing devices executing operating systems such as macOS®, Windows®, Linux®, various UNIX® or UNIX- or Linux-based operating systems, or other operating systems). In some embodiments, provider computing device 814 can include a vehicle-integrated computing device, such as a vehicle navigation system, or other computing device integrated with the vehicle itself.

In some embodiments, provider computing device 818 can include a provider communication device configured to communicate with users, such as drivers, passengers, pedestrians, and other users. In some embodiments, provider communication device 818 can communicate directly with management system 802 or through another provider computing device, such as provider computing device 816. In some embodiments, a requestor computing device can communicate 826 directly with provider communication device 818 over a peer-to-peer connection, Bluetooth connection, NFC connection, ad hoc wireless network, or any other communication channel or connection. Although particular devices are shown as communicating with management system 802 over networks 810 and 812, in various embodiments, management system 802 can expose an interface, such as an application programming interface (API) or service provider interface (SPI) to enable various third parties which may serve as an intermediary between end users and management system 802.

Although requestor/provider management environment 800 is shown with four provider devices and two requestor devices, any number of devices may be supported. The various components shown and described herein may be implemented in hardware, firmware, software, or combinations thereof. Although one embodiment of a requestor/provider management environment is depicted in FIG. 8, this is merely one implementation and not meant to be limiting.

Figure 9:
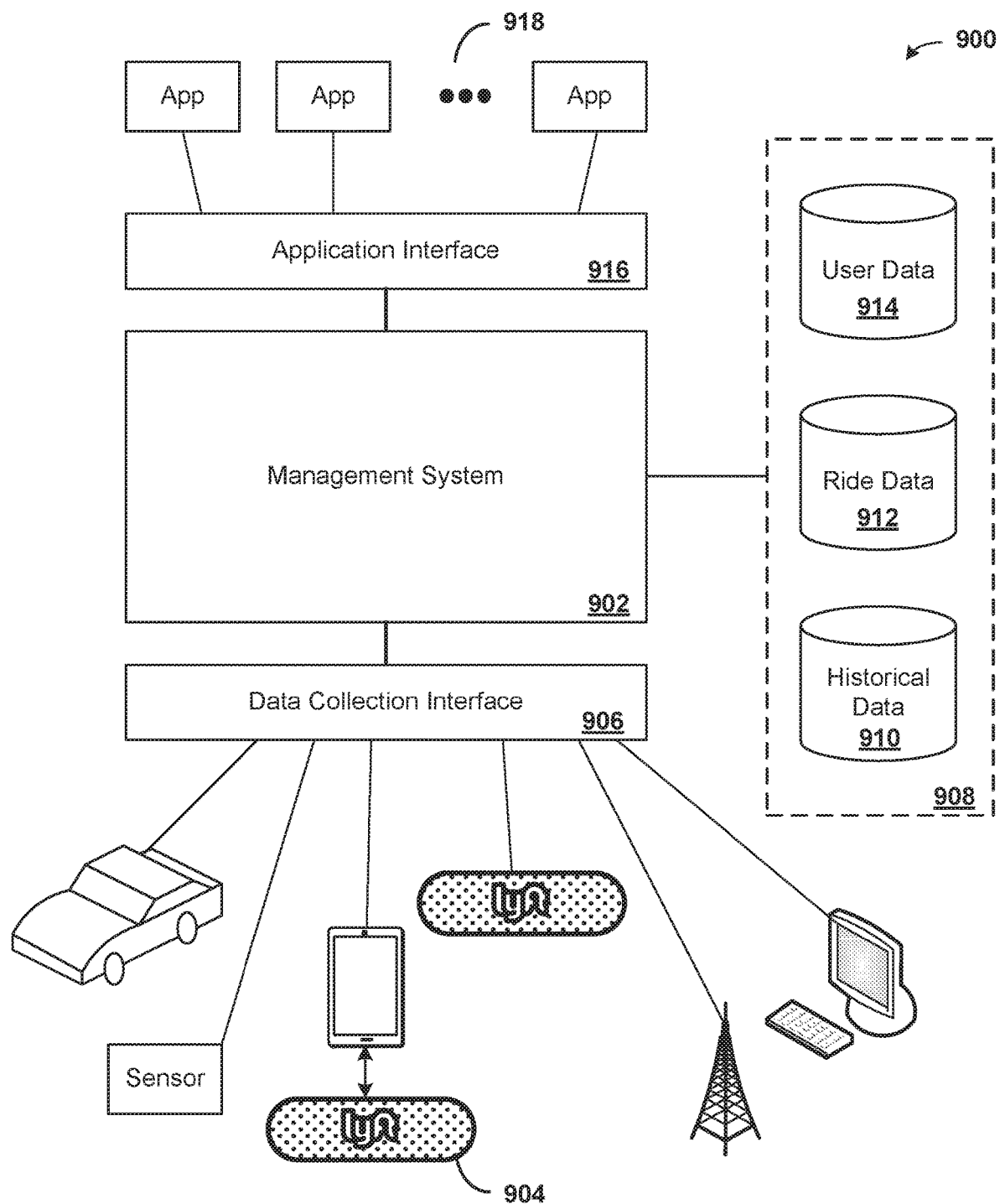
FIG. 9 illustrates an example data collection and application management system, in accordance with various embodiments.

FIG. 9 shows a data collection and application management environment 900, in accordance with various embodiments. As shown in FIG. 9, management system 902 may be configured to collect data from various data collection devices 904 through a data collection interface 906. As discussed above, management system 902 may include one or more computers and/or servers or any combination thereof. Data collection devices 904 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 906 can include, e.g., an extensible device framework configured to support interfaces for each data collection device. In various embodiments, data collection interface 906 can be extended to support new data collection devices as they are released and/or to update existing interfaces to support changes to existing data collection devices. In various embodiments, data collection devices may communicate with data collection interface 906 over one or more networks. The networks may include any network or communication protocol as would be recognized by one of ordinary skill in the art, including those networks discussed above.

As shown in FIG. 9, data received from data collection devices 904 can be stored in data store 908. Data store 908 can include one or more data stores, such as databases, object storage systems and services, cloud-based storage services, and other data stores. For example, various data stores may be implemented on a non-transitory storage medium accessible to management system 902, such as historical data store 910, ride data store 912, and user data store 914. Data stores 908 can be local to management system 902, or remote and accessible over a network, such as those networks discussed above or a storage-area network or other networked storage system. In various embodiments, historical data 910 may include historical traffic data, weather data, request data, road condition data, or any other data for a given region or regions received from various data collection devices. Ride data 912 may include route data, request data, timing data, and other ride related data, in aggregate and/or by requestor or provider. User data 914 may include user account data, preferences, location history, and other user-specific data. Although particular data stores are shown, any data collected and/or stored according to the various embodiments described herein may be stored in data stores 908.

As shown in FIG. 9, an application interface 916 can be provided by management system 902 to enable various apps 918 to access data and/or services available through management system 902. Apps 918 can run on various user devices (including provider and requestor computing devices, such as those discussed above) and/or may include cloud-based or other distributed apps configured to run across various devices (e.g., computers, servers, or combinations thereof). Apps 918 may include, e.g., aggregation and/or reporting apps which may utilize data 908 to provide various services (e.g., third-party ride request and management apps). In various embodiments, application interface 916 can include an API and/or SPI enabling third party development of apps 918. In some embodiments, application interface 916 may include a web interface, enabling web-based access to data 908 and/or services provided by management system 902. In various embodiments, apps 918 may run on devices configured to communicate with application interface 916 over one or more networks. The networks may include any network or communication protocol as would be recognized by one of ordinary skill in the art, including those networks discussed above, in accordance with an embodiment of the present disclosure.

Although a particular implementation of environment 900 is shown in FIG. 9, this is for illustration purposes only and not intended to be limited. In some embodiments, environment 900 may include fewer or more components, as would be recognized by one or ordinary skill in the art.

FIGS. 10A-10C show an example provider communication device 1000 in accordance with various embodiments. As shown in FIG. 10A, a front view 1002 of provider communication device 1000 shows a front display 1004. In some embodiments, front display 1004 may include a secondary region or separate display 1006. As shown in FIG. 10A, the front display may include various display technologies including, but not limited to, one or more liquid crystal displays (LCDs), one or more arrays of light emitting diodes (LEDs), or other display technologies. In some embodiments, the front display may include a cover that divides the display into multiple regions. In some embodiments, separate displays may be associated with each region. The front display 1004 can be configured to show colors, patterns, color patterns, or other identifying information to requestors and other users external to a provider vehicle. In some embodiments, the secondary region or separate display 1006 may be configured to display the same, or contrasting, information as front display 1004.

As shown in FIG. 10B, a rear view 1008 of provider communication device 1000 shows a rear display 1010. Rear display 1010, as with front display 1004, rear display 1010 may include various display technologies including, but not limited to, one or more liquid crystal displays (LCDs), one or more arrays of light emitting diodes (LEDs), or other display technologies. The rear display may be configured to display information to the provider, the requestor, or other users internal to a provider vehicle. In some embodiments, rear display 1010 may be configured to provide information to users external to the provider vehicle who are located behind the provider vehicle. As further shown in FIG. 10B, provider communication device may include a power button 1012 or other switch which can be used to turn on or off the provider communication device. In various embodiments, power button 1012 may be a hardware button or switch that physically controls whether power is provided to provider communication device 1000. Alternatively, power button 1012 may be a soft button that initiates a startup/shutdown procedure managed by software and/or firmware instructions. In some embodiments, provider communication device 1000 may not include a power button 1012. Additionally, provider communication device may include one or more light features 1014 (such as one or more LEDs or other light sources) configured to illuminate areas adjacent to the provider communication device 1000. In some embodiments, provider communication device 1000 can include a connector to enable a provider computing device to be connected to the provider communication device 1000. In some embodiments, power may be provided to the provider communication device through connector 1016.

FIG. 10C shows a block diagram of provider computing device 1000. As shown in FIG. 10C, provider communication device can include a processor 1018. Processor 1018 can control information displayed on rear display 1010 and front display 1004. As noted, each display can display information to different users, depending on the positioning of the users and the provider communication device. In some embodiments, display data 1020 can include stored display patterns, sequences, colors, text, or other data to be displayed on the front and/or rear display. In some embodiments, display data 1020 can be a buffer, storing display data as it is received from a connected provider computing device. In some embodiments, display data 1020 can include a hard disk drive, solid state drive, memory, or other storage device including information from a management system. In some embodiments, lighting controller 1022 can manage the colors and/or other lighting displayed by light features 1014. In some embodiments, communication component 1024 can manage networking or other communication between the provider communication device 1000 and one or more networking components or other computing devices. In various embodiments, communication component 1024 can be configured to communicate over Wi-Fi, Bluetooth, NFC, RF, or any other wired or wireless communication network or protocol. In some embodiments, provider communication device 1000 can include an input/output system 1026 configured to provide output in addition to that provided through the displays and/or to receive inputs from users. For example, I/O system 1026 can include an image capture device configured to recognize motion or gesture-based inputs from a user. Additionally, or alternatively, I/O system 1026 can include an audio device configured to provide audio outputs (such as alerts, instructions, or other information) to users and/or receive audio inputs, such as audio commands, which may be interpreted by a voice recognition system or other command interface. In some embodiments, I/O system may include one or more input or output ports, such as USB (universal serial bus) ports, lightning connector ports, or other ports enabling users to directly connect their devices to the provider communication device (e.g., to exchange data, verify identity information, provide power, etc.).

Figure 11:
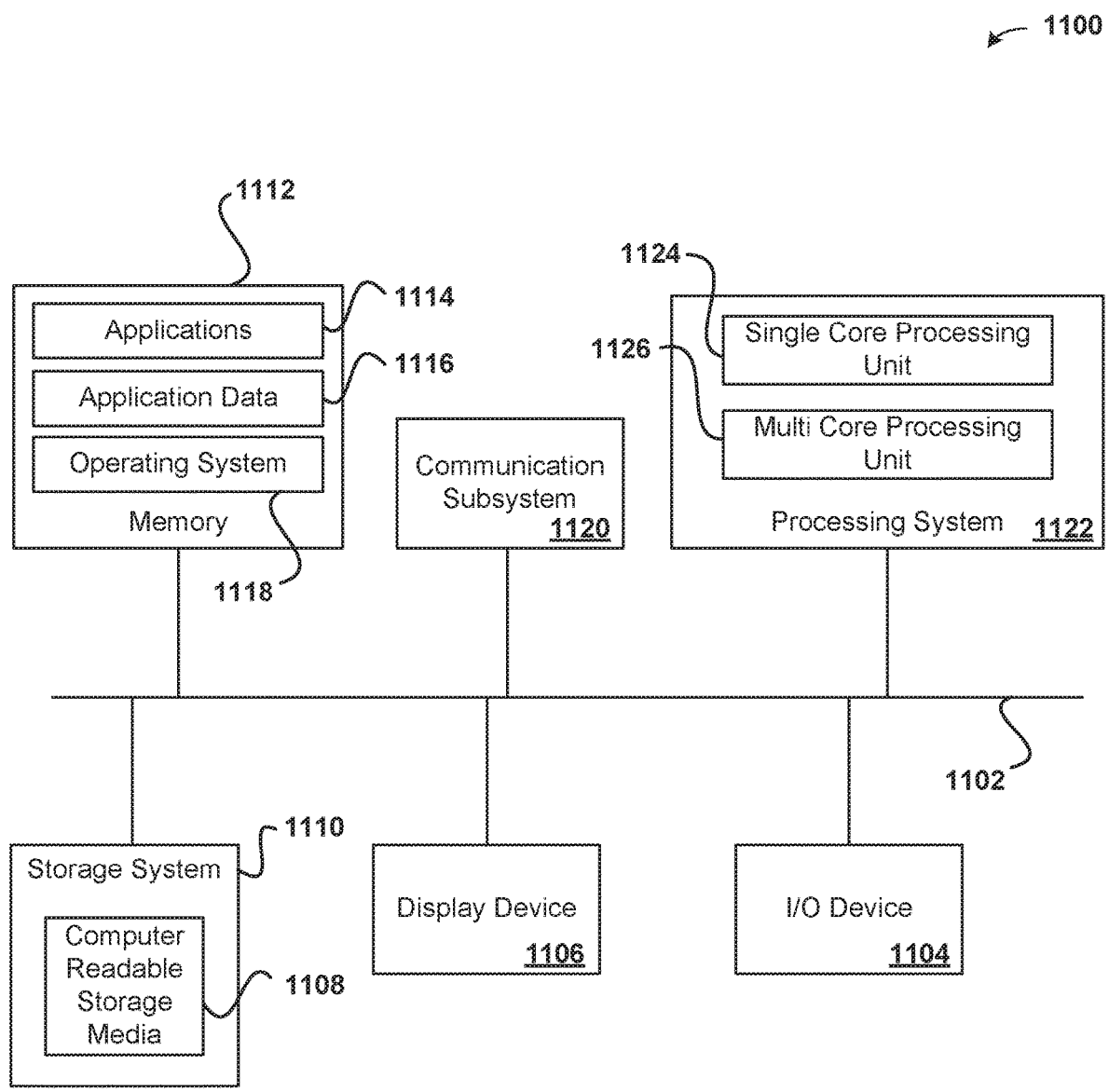
FIG. 11 illustrates an example computer system, in accordance with various embodiments.

FIG. 11 shows an example computer system 1100, in accordance with various embodiments. In various embodiments, computer system 1100 may be used to implement any of the systems, devices, or methods described herein. In some embodiments, computer system 1100 may correspond to any of the various devices described herein, including, but not limited, to mobile devices, tablet computing devices, wearable devices, personal or laptop computers, vehicle-based computing devices, or other devices or systems described herein. As shown in FIG. 11, computer system 1100 can include various subsystems connected by a bus 1102. The subsystems may include an I/O device subsystem 1104, a display device subsystem 1106, and a storage subsystem 1110 including one or more computer readable storage media 1108. The subsystems may also include a memory subsystem 1112, a communication subsystem 1120, and a processing subsystem 1122.

In system 1100, bus 1102 facilitates communication between the various subsystems. Although a single bus 1102 is shown, alternative bus configurations may also be used. Bus 1102 may include any bus or other component to facilitate such communication as is known to one of ordinary skill in the art. Examples of such bus systems may include a local bus, parallel bus, serial bus, bus network, and/or multiple bus systems coordinated by a bus controller. Bus 1102 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 1104 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 1104 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer system 1100 may include a display device subsystem 1106. Display device subsystem may include one or more lights, such as an one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 1106 may include a controller and/or interface for controlling and/or communicating with an external display, such as any of the above-mentioned display technologies.

As shown in FIG. 11, system 1100 may include storage subsystem 1110 including various computer readable storage media 1108, such as hard disk drives, solid state drives (including RAM-based and/or flash-based SSDs), or other storage devices. In various embodiments, computer readable storage media 1108 can be configured to store software, including programs, code, or other instructions, that is executable by a processor to provide functionality described herein. In some embodiments, storage system 1110 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 1110 can include a media reader, card reader, or other storage interface to communicate with one or more external and/or removable storage devices. In various embodiments, computer readable storage media 1108 can include any appropriate storage medium or combination of storage media. For example, computer readable storage media 1108 can include, but is not limited to, any one or more of random access memory (RAM), read only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer readable storage media can include data signals or any other medium through which data can be sent and/or received.

Memory subsystem 1112 can include various types of memory, including RAM, ROM, flash memory, or other memory. Memory 1112 can include SRAM (static RAM) or DRAM (dynamic RAM). In some embodiments, memory 1112 can include a BIOS (basic input/output system) or other firmware configured to manage initialization of various components during, e.g., startup. As shown in FIG. 11, memory 1112 can include applications 1114 and application data 1110. Applications 1114 may include programs, code, or other instructions, that can be executed by a processor. Applications 1114 can include various applications such as browser clients, location management applications, ride management applications, data management applications, and any other application. Application data 1116 can include any data produced and/or consumed by applications 1114. Memory 1112 can additionally include operating system 1118, such as macOS®, Windows®, Linux®, various UNIX® or UNIX- or Linux-based operating systems, or other operating systems.

System 1100 can also include a communication subsystem 1120 configured to facilitate communication between system 1100 and various external computer systems and/or networks (such as the Internet, a local area network (LAN), a wide area network (WAN), a mobile network, or any other network). Communication subsystem 1120 can include hardware and/or software to enable communication over various wired (such as Ethernet or other wired communication technology) or wireless communication channels, such as radio transceivers to facilitate communication over wireless networks, mobile or cellular voice and/or data networks, Wi-Fi networks, or other wireless communication networks. For example, the communication network is shown as communication network 170 in FIG. 1. Additionally, or alternatively, communication subsystem 1120 can include hardware and/or software components to communicate with satellite-based or ground-based location services, such as GPS (global positioning system). In some embodiments, communication subsystem 1120 may include, or interface with, various hardware or software sensors. The sensors may be configured to provide continuous or and/or periodic data or data streams to a computer system through communication subsystem 1120

As shown in FIG. 11, processing system 1122 can include one or more processors or other devices operable to control computing system 1100. Such processors can include single core processors 1124, multi core processors, which can include central processing units (CPUs), graphical processing units (GPUs), application specific integrated circuits (ASICs), digital signal processors (DSPs) or any other generalized or specialized microprocessor or integrated circuit. Various processors within processing system 1122, such as processors 1124 and 1126, may be used independently or in combination depending on application.

Various other configurations are may also be used, with particular elements that are depicted as being implemented in hardware may instead be implemented in software, firmware, or a combination thereof. One of ordinary skill in the art will recognize various alternatives to the specific embodiments described herein.

The specification and figures describe particular embodiments which are provided for ease of description and illustration and are not intended to be restrictive. Embodiments may be implemented to be used in various environments without departing from the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of managing transportation services comprising:
   receiving, by a dynamic transportation matching system from a requestor device, a transportation request indicating a pickup location;
   determining a pickup action to be performed for the transportation request;
   identifying, within a geographical area corresponding to the pickup location, a plurality of instances of prior transport data comprising a threshold number of instances of a prior pickup data and one or more instances of prior drop-off data, wherein the prior pickup data corresponds to the pickup action;
   generating a boundary for a sub-cluster comprising the plurality of instances of prior transport data;
   utilizing the sub-cluster of the prior transport data to identify a suggested location for the pickup action to be performed for the transportation request, wherein the suggested location is within the boundary; and
   providing the suggested location to the requestor device.

2. The method of claim 1, wherein utilizing the sub-cluster of the prior transport data to identify the suggested location comprises determining a weighted average location of the plurality of instances of prior transport data.

3. The method of claim 1, further comprising:
   determining a drop-off action to be performed for a second transportation request at a drop-off location;
   identifying a second plurality of instances of prior transport data within a geographical area corresponding to the drop-off location, wherein the second plurality of instances of prior transport data does not include at least a threshold number of instances of prior drop-off data corresponding to the drop-off action; and
   disregarding the second plurality of instances of prior transport data based on the second plurality of instances of prior transport data not including at least the threshold number of instances of prior drop-off data corresponding to the drop-off action.

4. The method of claim 1, further comprising:
   determining that the prior pickup data corresponds to the pickup action; and
   wherein utilizing the sub-cluster of the prior transport data to identify a suggested location for the pickup action comprises weighting the threshold number of instances of the prior pickup data more heavily than the one or more instances of the prior drop-off data.

5. The method of claim 1, further comprising:
   determining that the pickup location indicated by the transportation request is at a location where the pickup action cannot be performed; and determining, by analyzing the sub-cluster of the prior transport data, a requestor intent based on the pickup location being at a location where the pickup action cannot be performed.

6. The method of claim 5, wherein utilizing the sub-cluster of the prior transport data to identify a suggested location for the pickup action comprises identifying a location where the pickup action can be performed for the transportation request based on the requestor intent.

7. The method of claim 1, wherein utilizing the sub-cluster of the prior transport data to identify a suggested location for the pickup action comprises:
 identifying, for the plurality of instances of prior transport data, prior actual pickup locations of pickup actions;
 determining relationships between the prior actual pickup locations and corresponding request locations of the plurality of instances of prior transport data; and
 determining a suggested location for the pickup action to be performed for the transportation request based on the determined relationships.

8. A non-transitory computer readable medium comprising instructions that, when executed by at least one processor, cause a computing device to:
 receive, by a dynamic transportation matching system from a requestor device, a transportation request indicating a pickup location;
 determine a pickup action to be performed for the transportation request;
 identify, within a geographical area corresponding to the pickup location, a plurality of instances of prior transport data comprising a threshold number of instances of a prior pickup data and one or more instances of prior drop-off data, wherein the prior pickup data corresponds to the pickup action;
 generate a boundary for a sub-cluster comprising the plurality of instances of prior transport data;
 utilize the sub-cluster of the prior transport data to identify a suggested location for the pickup action to be performed for the transportation request, wherein the suggested location is within the boundary; and
 provide the suggested location to the requestor device.

9. The non-transitory computer readable medium of claim 8, further comprising instructions that, when executed by the at least one processor, cause the computing device to utilize the sub-cluster of the prior transport data to identify the suggested location by determining a weighted average location of the plurality of instances of prior transport data.

10. The non-transitory computer readable medium of claim 8, further comprising instructions that, when executed by the at least one processor, cause the computing device to:
 determine a drop-off action to be performed for a second transportation request at a drop-off location;
 identify a second plurality of instances of prior transport data within a geographical area corresponding to the drop-off location, wherein the second plurality of instances of prior transport data does not include at least a threshold number of instances of prior drop-off data corresponding to the drop-off action; and
 disregard the second plurality of instances of prior transport data based on the second plurality of instances of prior transport data not including at least the threshold number of instances of prior drop-off data corresponding to the drop-off action.

11. The non-transitory computer readable medium of claim 8, further comprising instructions that, when executed by the at least one processor, cause the computing device to:
 determine that the prior pickup data corresponds to the pickup action; and
 utilize the sub-cluster of the prior transport data to identify a suggested location for the pickup action by weighting the threshold number of instances of the prior pickup data more heavily than the one or more instances of the prior drop-off data.

12. The non-transitory computer readable medium of claim 8, further comprising instructions that, when executed by the at least one processor, cause the computing device to:
 determine that the pickup location indicated by the transportation request is at a location where the pickup action cannot be performed; and
 determine, by analyzing the sub-cluster of the prior transport data, a requestor intent based on the pickup location being at a location where the pickup action cannot be performed.

13. The non-transitory computer readable medium of claim 12, further comprising instructions that, when executed by the at least one processor, cause the computing device to utilize the sub-cluster of the prior transport data to identify a suggested location for the pickup action by identifying a location where the pickup action can be performed for the transportation request based on the requestor intent.

14. The non-transitory computer readable medium of claim 8, further comprising instructions that, when executed by the at least one processor, cause the computing device to utilize the sub-cluster of the prior transport data to identify a suggested location for the pickup action by:
 identifying, for the plurality of instances of prior transport data, prior actual pickup locations of pickup actions;
 determining relationships between the prior actual pickup locations and corresponding request locations of the plurality of instances of prior transport data; and
 determining a suggested location for the pickup action to be performed for the transportation request based on the determined relationships.

15. A system comprising:
 at least one processor; and
 a non-transitory computer readable medium comprising instructions that, when executed by the at least one processor, cause the system to:
  receive, by a dynamic transportation matching system from a requestor device, a transportation request indicating a pickup location;
  determine a pickup action to be performed for the transportation request;
  identify, within a geographical area corresponding to the pickup location, a plurality of instances of prior transport data comprising a threshold number of instances of a prior pickup data and one or more instances of prior drop-off data, wherein the prior pickup data corresponds to the pickup action;
  generate a boundary for a sub-cluster comprising the plurality of instances of prior transport data;
  utilize the sub-cluster of the prior transport data to identify a suggested location for the pickup action to be performed for the transportation request, wherein the suggested location is within the boundary; and
  provide the suggested location to the requestor device.

16. The system of claim 15, further comprising instructions that, when executed by the at least one processor, cause the system to utilize the sub-cluster of the prior transport data to identify the suggested location by determining a weighted average location of the plurality of instances of prior transport data.

17. The system of claim 15, further comprising instructions that, when executed by the at least one processor, cause the system to:
  determine a drop-off action to be performed for a second transportation request at a drop-off location;
  identify a second plurality of instances of prior transport data within a geographical area corresponding to the drop-off location, wherein the second plurality of instances of prior transport data does not include at least a threshold number of instances of prior drop-off data corresponding to the drop-off action; and
  disregard the second plurality of instances of prior transport data based on the second plurality of instances of prior transport data not including at least the threshold number of instances of prior drop-off data corresponding to the drop-off action.

18. The system of claim 15, further comprising instructions that, when executed by the at least one processor, cause the system to:
  determine that the prior pickup data corresponds to the pickup action; and
  utilize the sub-cluster of the prior transport data to identify a suggested location for the pickup action by weighting the threshold number of instances of the prior pickup data more heavily than the one or more instances of the prior drop-off data.

19. The system of claim 15, further comprising instructions that, when executed by the at least one processor, cause the system to:
  determine that the pickup location indicated by the transportation request is at a location where the pickup action cannot be performed; and
  determine, by analyzing the sub-cluster of the prior transport data, a requestor intent based on the pickup location being at a location where the pickup action cannot be performed.

20. The system of claim 19, further comprising instructions that, when executed by the at least one processor, cause the system to utilize the sub-cluster of the prior transport data to identify a suggested location for the pickup action by identifying a location where the pickup action can be performed for the transportation request based on the requestor intent.

* * * * *